Jan. 22, 1963
W. HANSTEIN, JR., ETAL
3,074,629
ACCUMULATOR FOR ACCOUNTING MACHINES
Filed Oct. 31, 1957
20 Sheets-Sheet 1
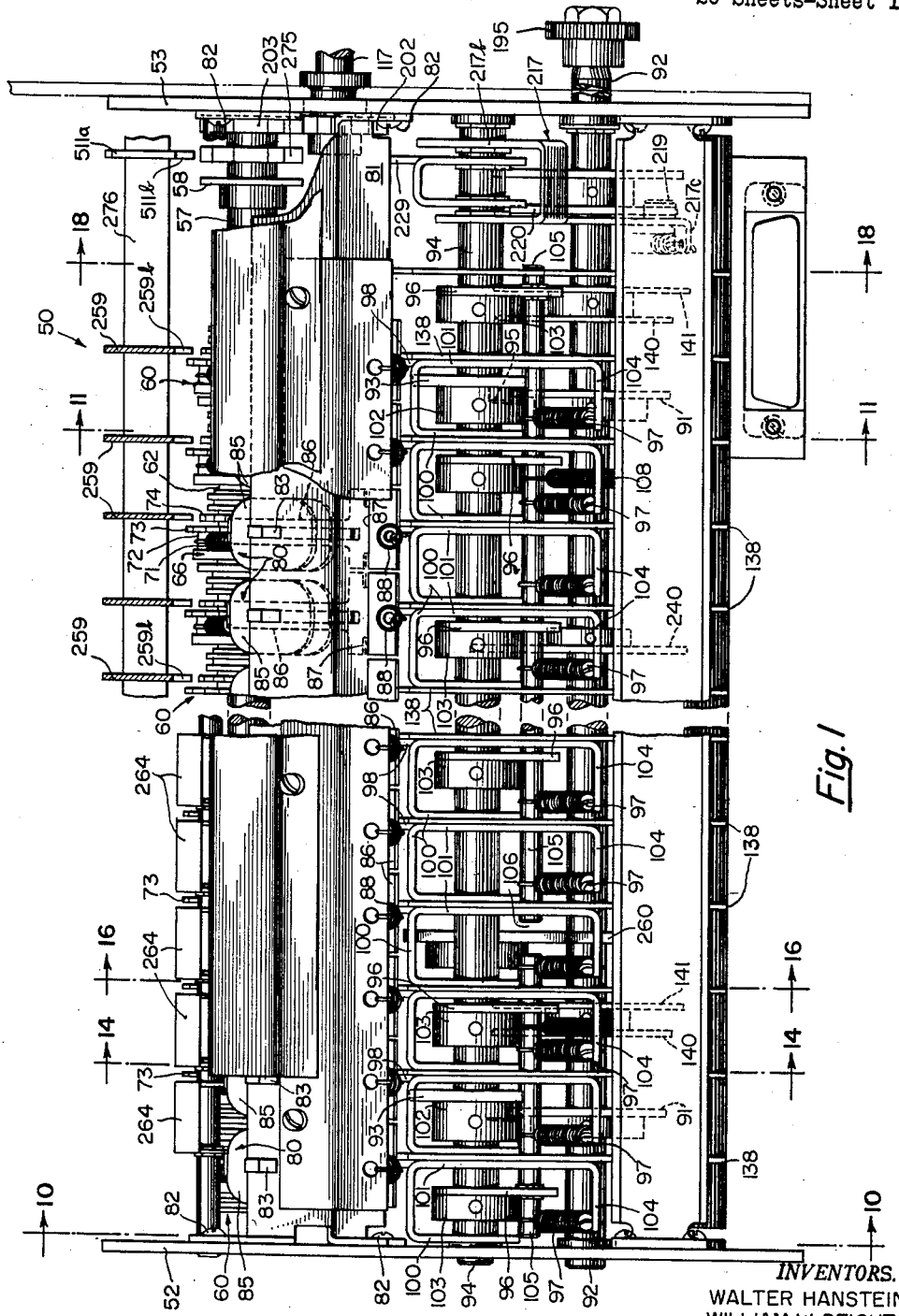
Fig. 1
INVENTORS.
WALTER HANSTEIN JR
WILLIAM W. DEIGHTON
BY 
AGENT

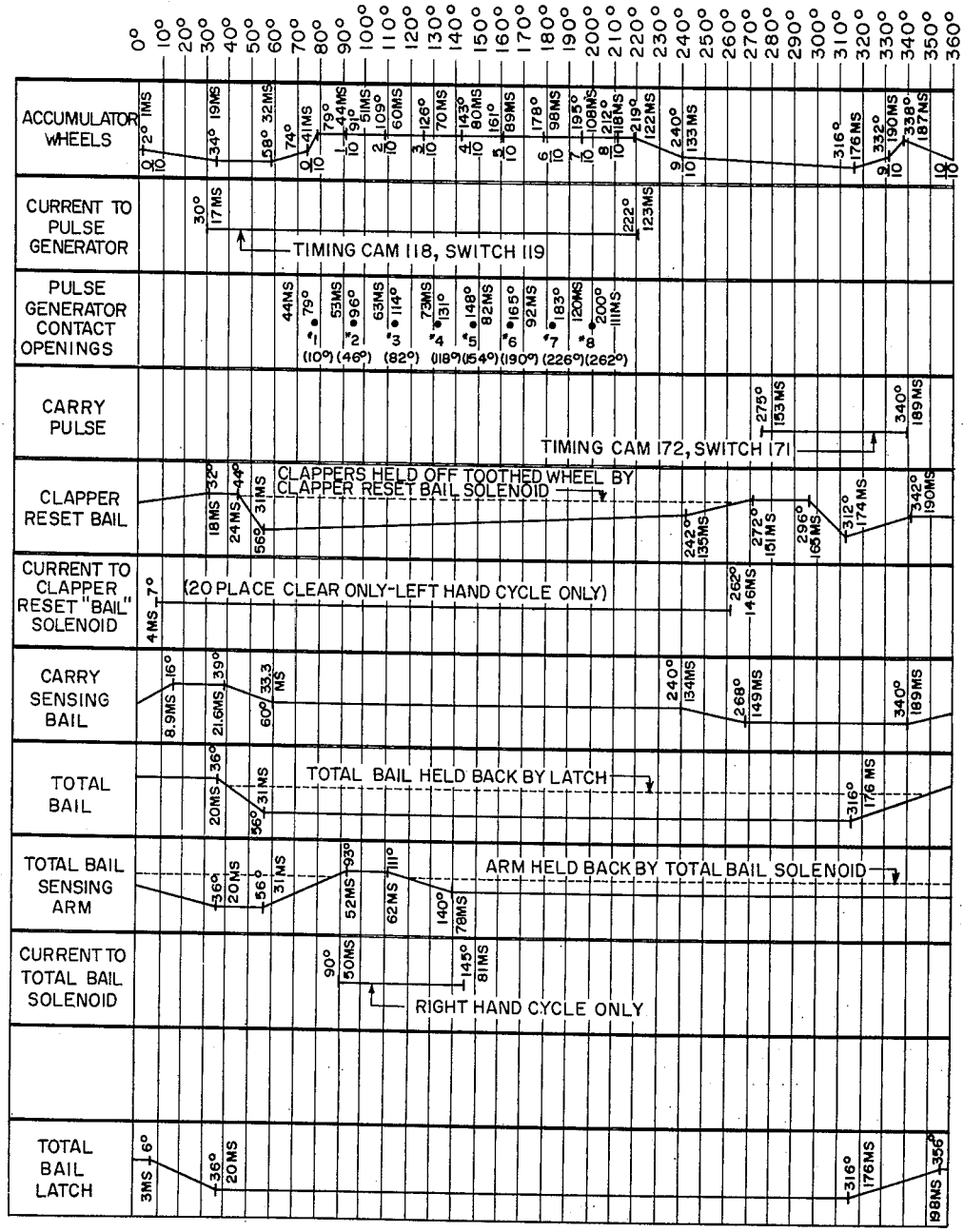
Fig. 2
INVENTORS.
WALTER HANSTEIN JR.
WILLIAM W. DEIGHTON
BY
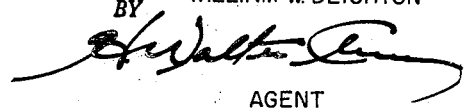
AGENT

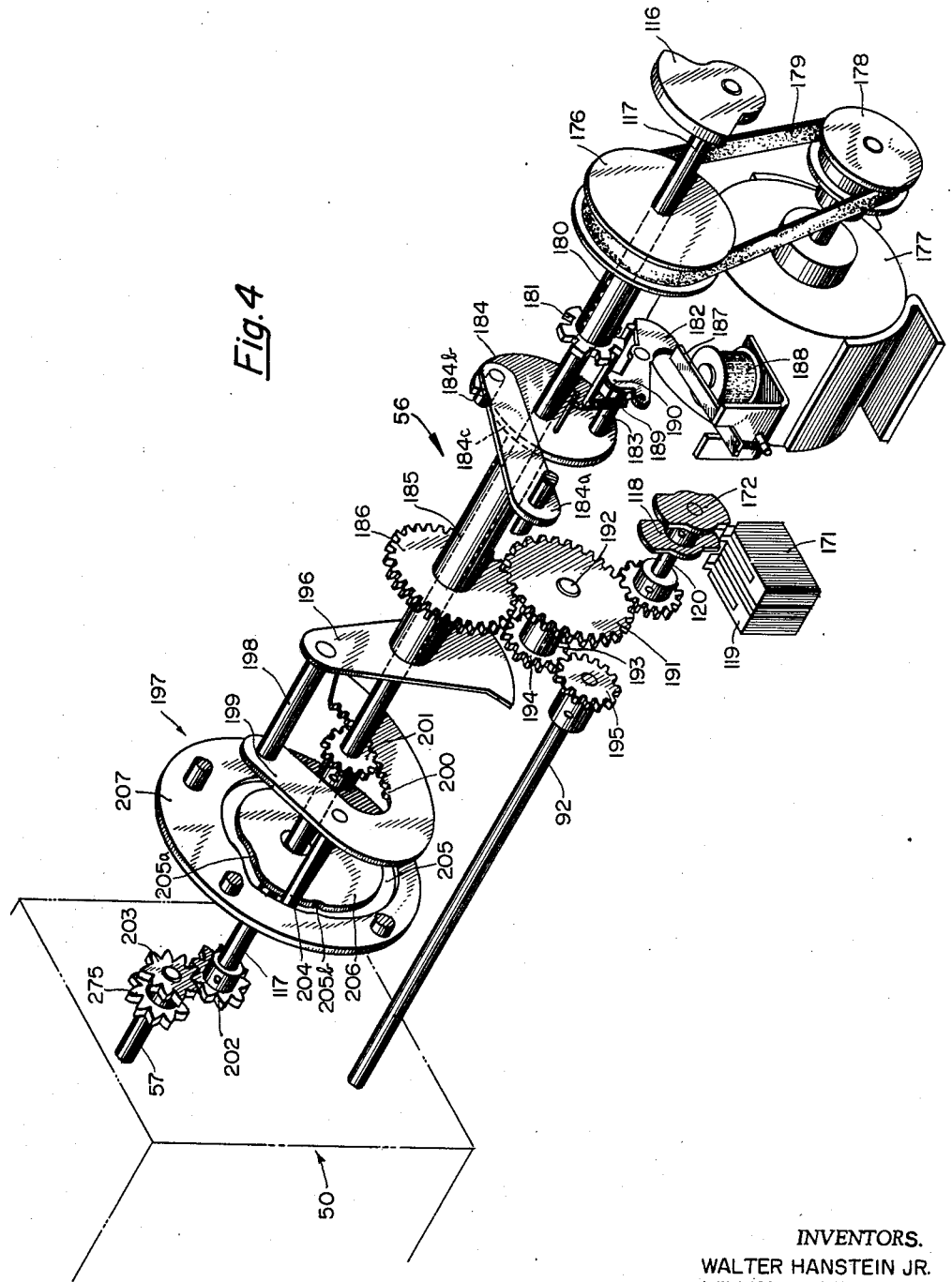

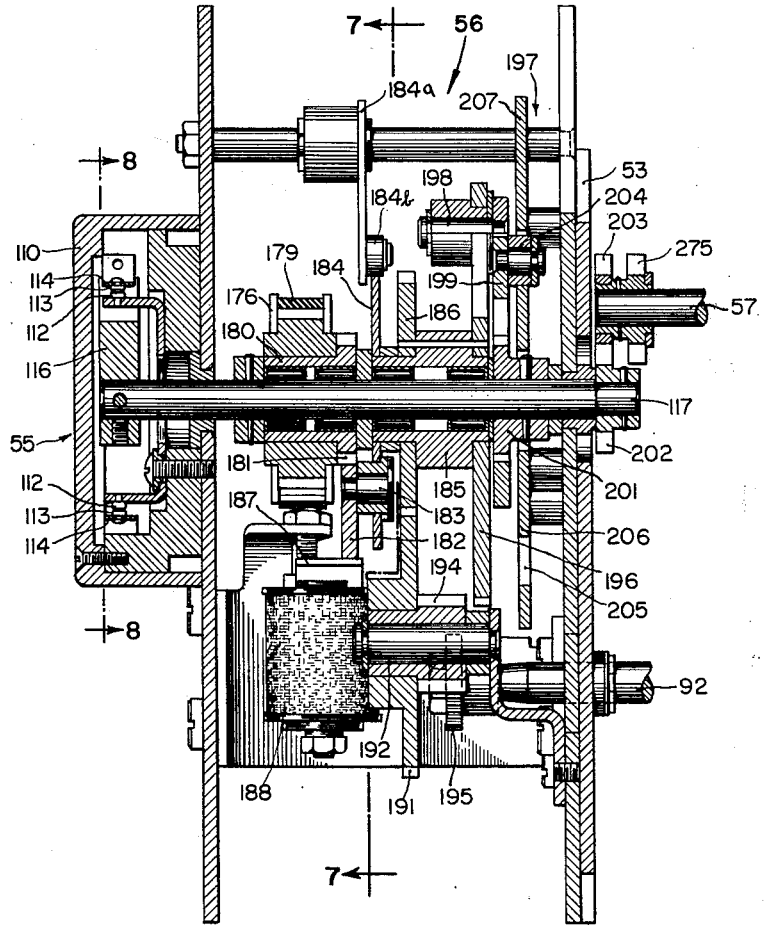
Fig. 6
Fig. 5
INVENTORS.
WALTER HANSTEIN JR.
WILLIAM W. DEIGHTON
BY
AGENT Jan. 22, 1963   W. HANSTEIN, JR., ETAL   3,074,629
ACCUMULATOR FOR ACCOUNTING MACHINES
Filed Oct. 31, 1957   20 Sheets-Sheet 6

INVENTORS.
WALTER HANSTEIN JR.
WILLIAM W. DEIGHTON
BY
AGENT

Jan. 22, 1963 W. HANSTEIN, JR., ETAL 3,074,629
ACCUMULATOR FOR ACCOUNTING MACHINES
Filed Oct. 31, 1957 20 Sheets-Sheet 8

INVENTORS.
WALTER HANSTEIN JR.
WILLIAM W. DEIGHTON
BY
AGENT

Jan. 22, 1963 W. HANSTEIN, JR., ET AL 3,074,629
ACCUMULATOR FOR ACCOUNTING MACHINES
Filed Oct. 31, 1957 20 Sheets-Sheet 9

INVENTORS.
WALTER HANSTEIN JR.
WILLIAM W. DEIGHTON
BY
AGENT

INVENTORS.
WALTER HANSTEIN JR.
WILLIAM W. DEIGHTON

AGENT

Jan. 22, 1963 W. HANSTEIN, JR., ETAL 3,074,629
ACCUMULATOR FOR ACCOUNTING MACHINES
Filed Oct. 31, 1957 20 Sheets-Sheet 11
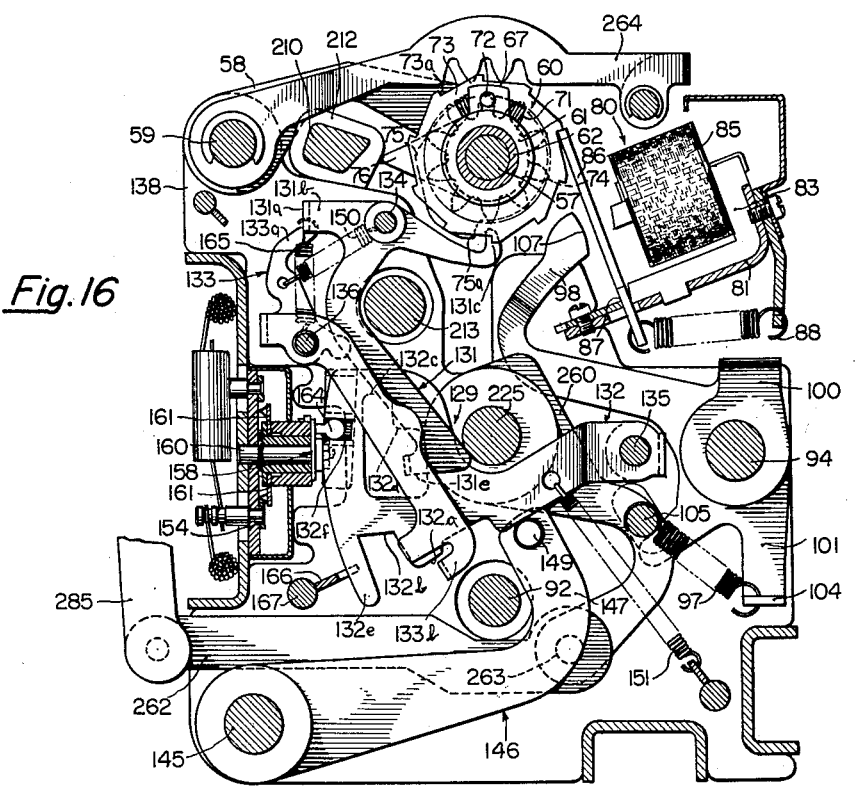
Fig. 16
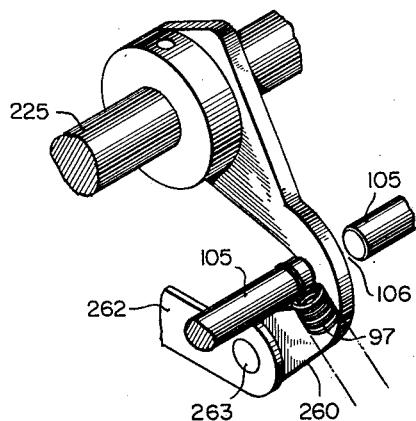
Fig. 17
INVENTORS.
WALTER HANSTEIN JR.
WILLIAM W. DEIGHTON
BY
AGENT

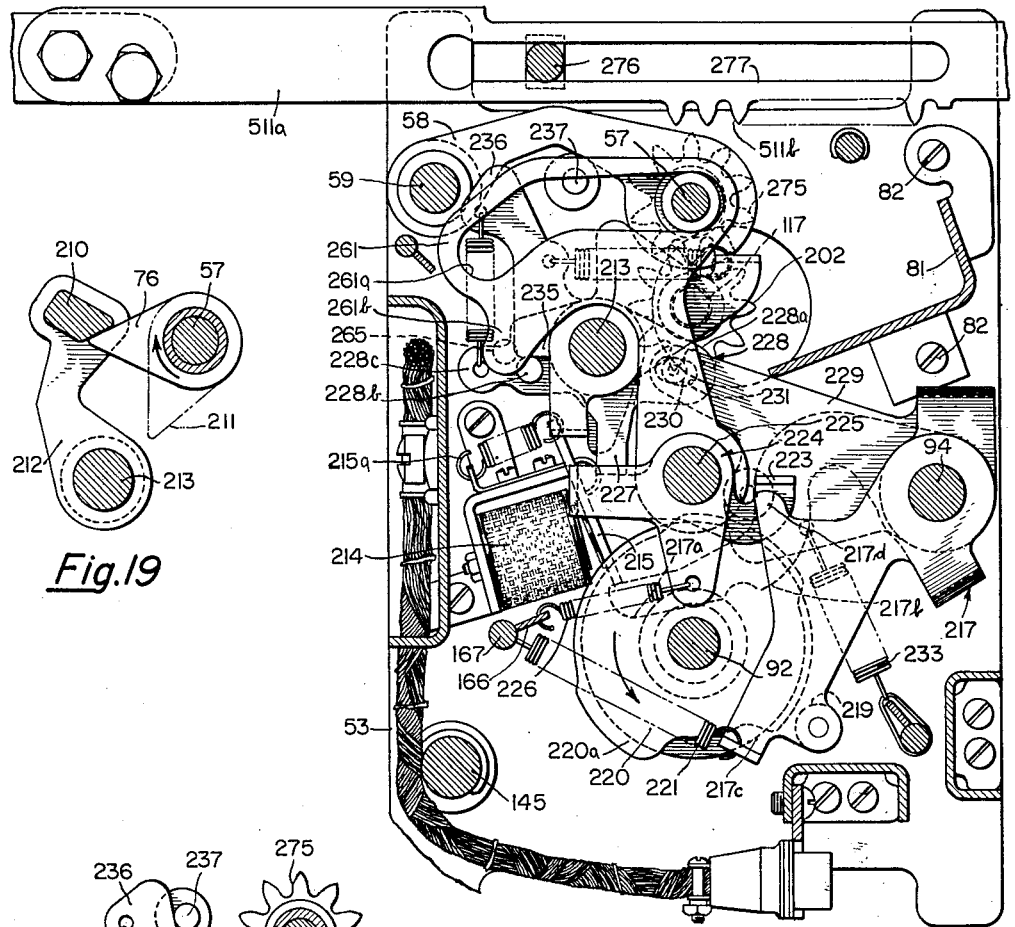
Fig.19
Fig.18
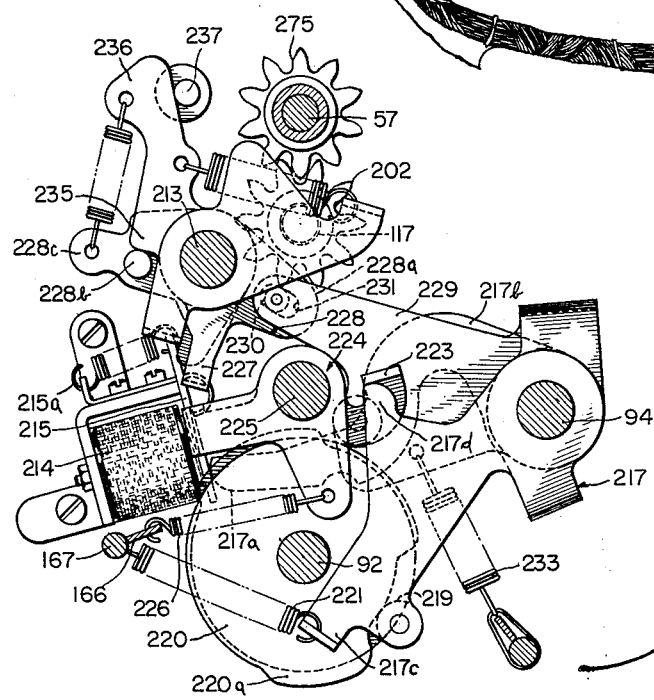
Fig.20
INVENTORS.
WALTER HANSTEIN JR.
WILLIAM W. DEIGHTON
BY
AGENT Jan. 22, 1963   W. HANSTEIN, JR., ETAL   3,074,629
ACCUMULATOR FOR ACCOUNTING MACHINES
Filed Oct. 31, 1957   20 Sheets-Sheet 13
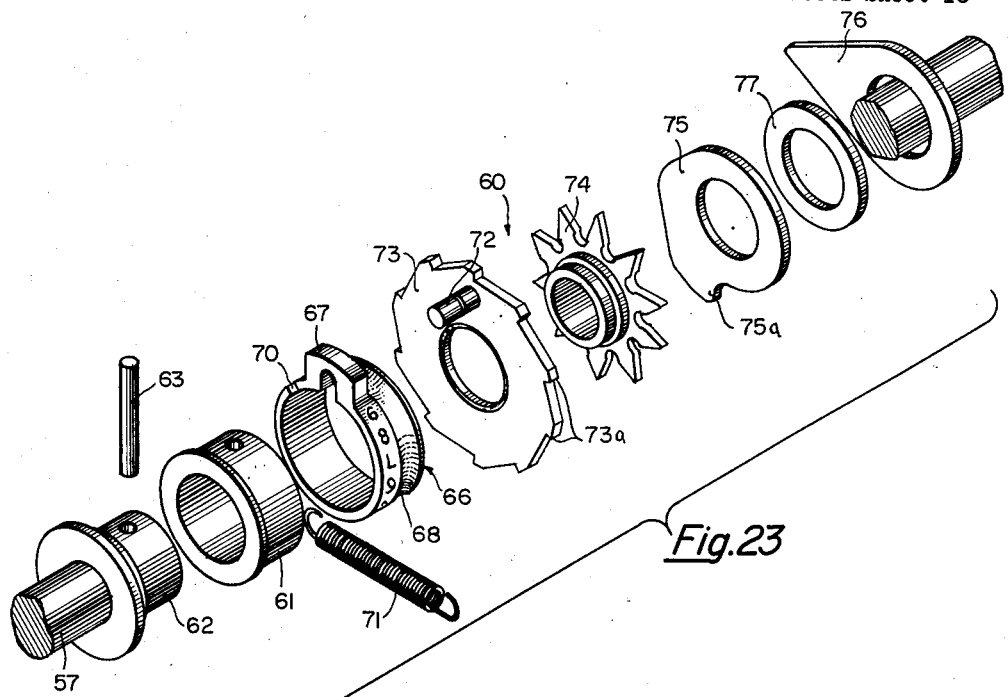
Fig.23
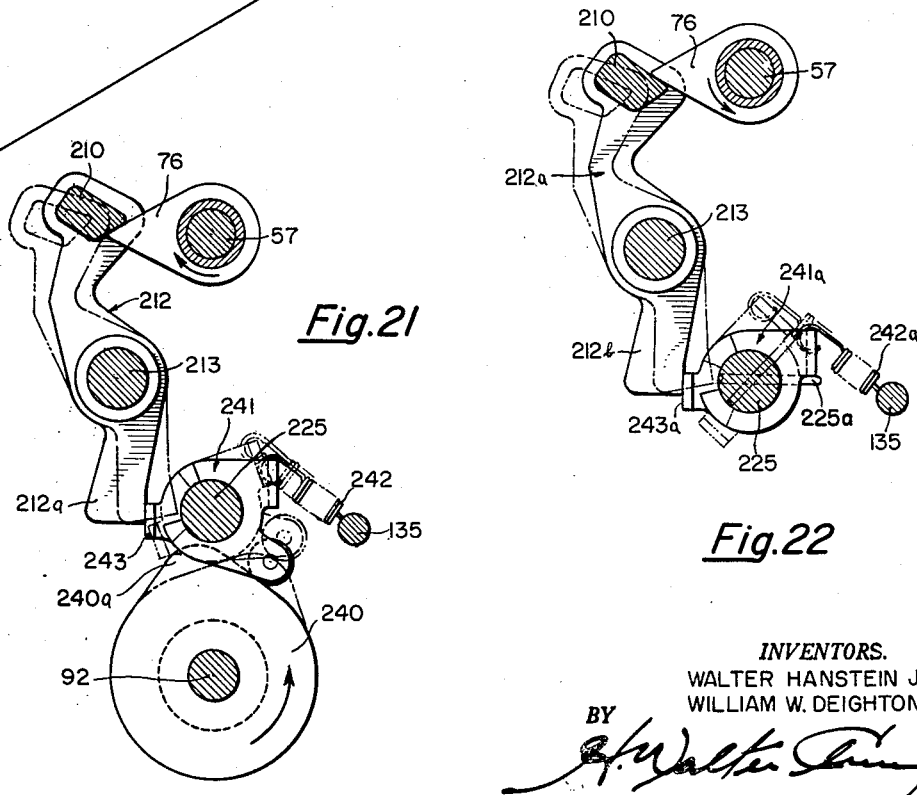
Fig.21
Fig.22
INVENTORS.
WALTER HANSTEIN JR.
WILLIAM W. DEIGHTON
BY
AGENT

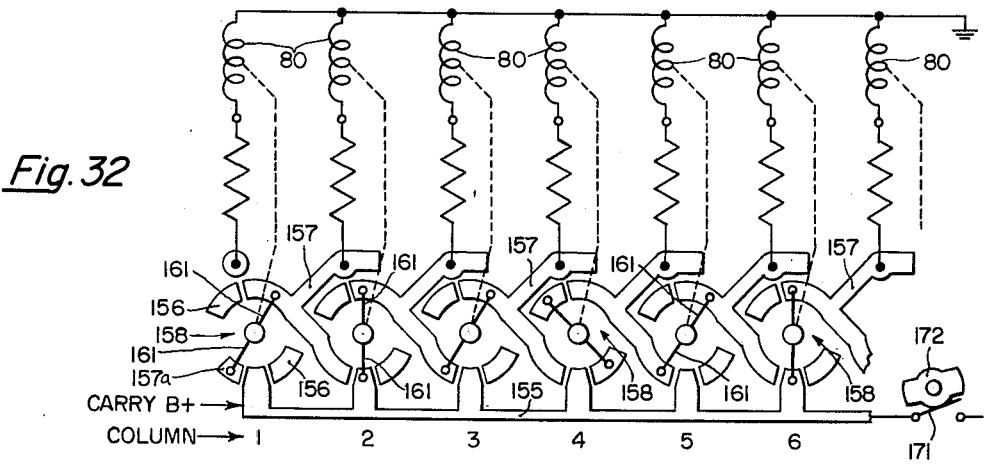
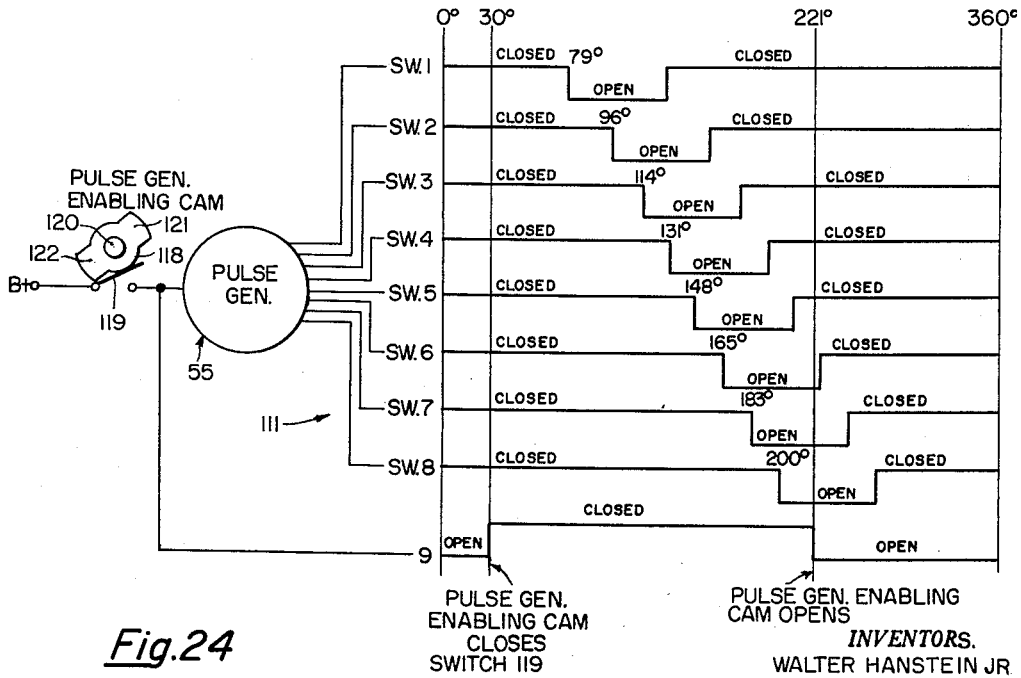
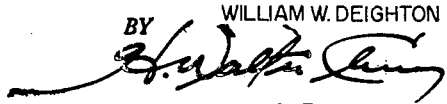

Jan. 22, 1963   W. HANSTEIN, JR., ETAL   3,074,629
ACCUMULATOR FOR ACCOUNTING MACHINES
Filed Oct. 31, 1957   20 Sheets-Sheet 15

INVENTORS.
WALTER HANSTEIN JR.
WILLIAM W. DEIGHTON

BY

AGENT

INVENTORS.
WALTER HANSTEIN JR.
WILLIAM W. DEIGHTON

BY

AGENT

Jan. 22, 1963  W. HANSTEIN, JR., ETAL  3,074,629
ACCUMULATOR FOR ACCOUNTING MACHINES
Filed Oct. 31, 1957  20 Sheets-Sheet 17

INVENTORS.
WALTER HANSTEIN JR.
WILLIAM W. DEIGHTON
BY
AGENT

Jan. 22, 1963 W. HANSTEIN, JR., ETAL 3,074,629
ACCUMULATOR FOR ACCOUNTING MACHINES
Filed Oct. 31, 1957 20 Sheets-Sheet 18
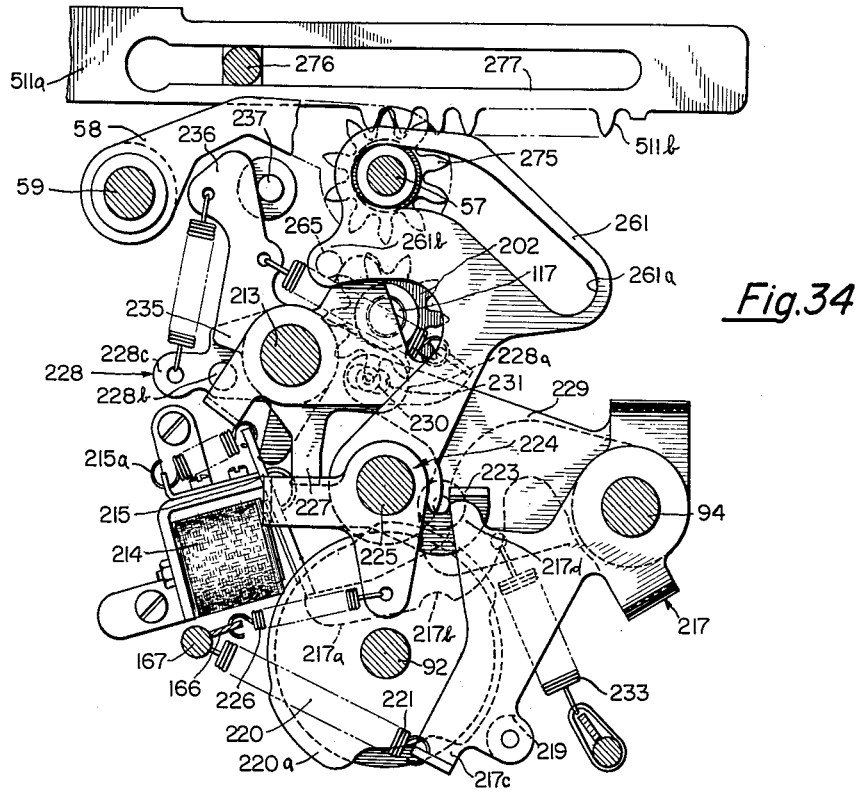
Fig.34
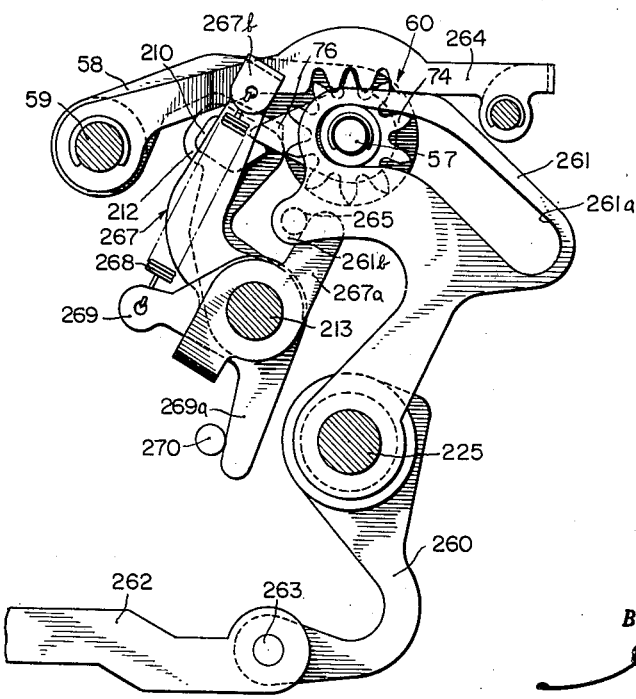
Fig.35
INVENTORS.
WALTER HANSTEIN JR.
WILLIAM W. DEIGHTON
BY
AGENT

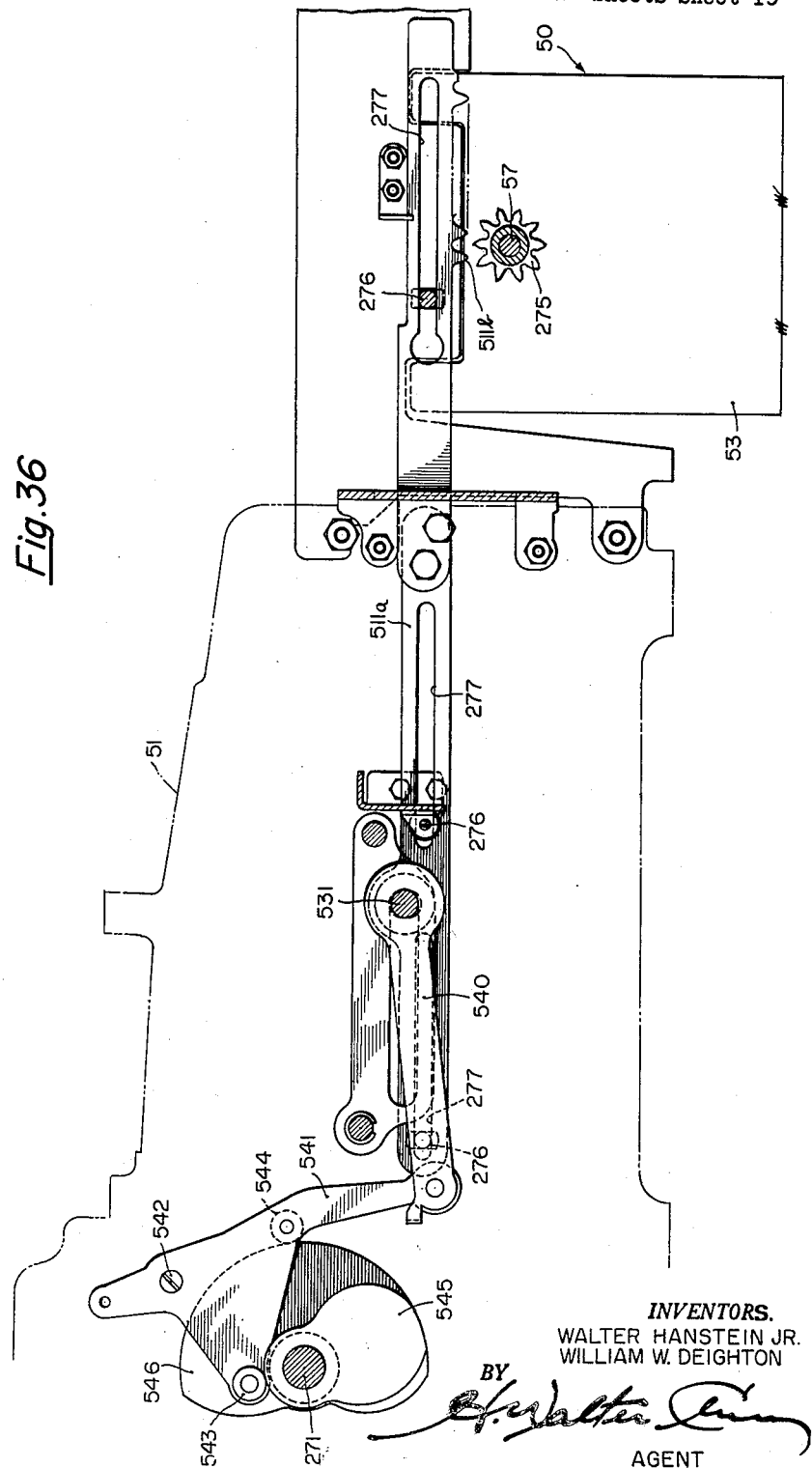

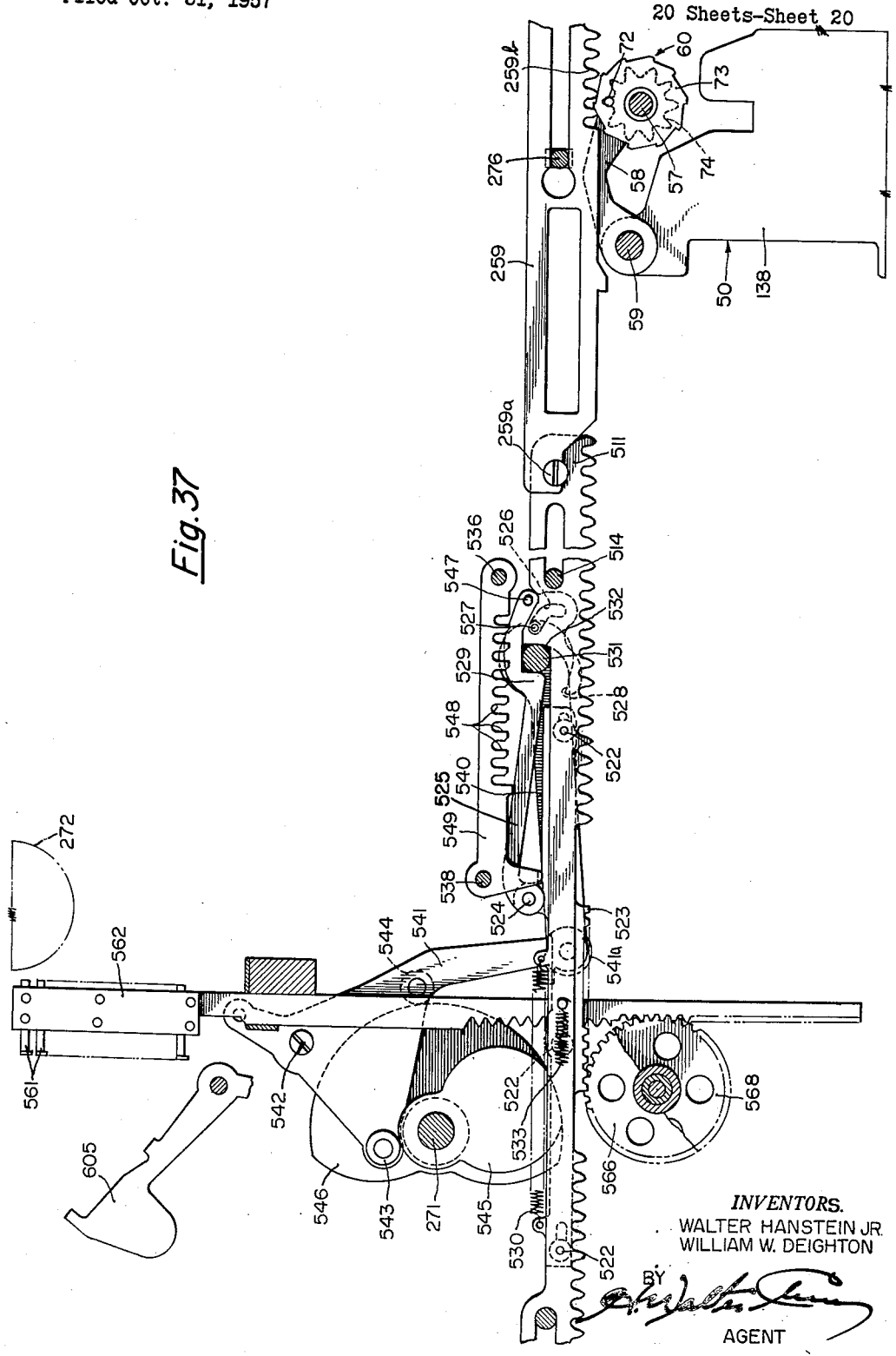

United States Patent Office 3,074,629
Patented Jan. 22, 1963

3,074,629
ACCUMULATOR FOR ACCOUNTING MACHINES
Walter Hanstein, Jr., Villanova, and William W. Deighton, Glen Mills, Pa., assignors to Burroughs Corporation, Detroit, Mich., a corporation of Michigan
Filed Oct. 31, 1957, Ser. No. 693,779
8 Claims. (Cl. 235—61)

The invention hereinafter described and claimed has to do with accounting machines, but more particularly to apparatus for adding digits during the operation of the machine. With still more particularity the invention relates to apparatus for accumulating partial products during the operation of a multiplying accounting machine and thereafter effecting transfer of the total to the printing mechanism of the machine.

While the apparatus of the invention is of broader applicability, it is particularly useful in conjunction with other apparatus enabling accounting machines of the type such as that disclosed in the United States Patent No. 2,629,549 to Butler and assigned to the assignee of the present invention, to accomplish multiplication in addition to their usual functions. Other components of such multiplying apparatus have been described and claimed in the following identified co-pending applications, all assigned to the assignee of the present invention: Hanstein, Friction Clutch, S.N. 587,058, filed May 24, 1957, now Patent No. 2,961,079; Jones et al., Accounting Machine Mechanism, S.N. 645,537, filed March 12, 1957, now Patent No. 3,007,631; Jones, Program Selecting Apparatus for an Automatic Machine, S.N. 646,414, filed March 15, 1957, now Patent No. 2,981,467; and Bradshaw et al., Multiplier Accounting Machine, S.N. 724,985, filed March 31, 1958, now Patent No. 3,002,689.

In the manufacture of multiplying accounting machines, manufacturers have approached the problem from different directions. Some provide the multiplying apparatus as an integral part of the basic accounting machine, while others supply it as an adjunct to basic machines already being manufactured. One important advantage of the present invention is that it is suited for use in multiplying apparatus in both applications.

An important object of the invention is to provide apparatus for adding digits during the operation of an accounting machine.

Another important object of the invention is to provide apparatus for the progressive accumulation of right and left hand components of partial products during the operation of a multiplying accounting machine.

Still another object of the invention is to provide such an accumulator which is capable of operation at high speed.

An additional object of the invention is to provide apparatus of this type which includes a unique carry system.

Still another object of the invention is to provide accumulator apparatus including novel round-off and clear mechanism.

A further object of the invention is to provide in such accumulators improved means for transferring the total to the printing mechanism of an accounting machine.

Other objects and advantages of the invention will be apparent to those skilled in the art from the hereinafter set forth detailed description of a particular embodiment thereof as adapted to one type of accounting machine.

In the drawings:

FIG. 1 is an elevational view with parts broken away of apparatus embodying the invention as seen if looking from the rear of the basic machine;

FIG. 2 is a timing diagram of the apparatus;

FIG. 4 is a somewhat diagrammatic expanded perspective view of the accumulator drive means;

FIG. 5 is a fragmentary elevational view showing the cam portion of the intermittent drive mechanism;

FIG. 6 is a sectional view of the apparatus shown in FIG. 4 but as actually assembled;

FIG. 16 is a sectional view taken along the line 16—16 of FIG. 1;

FIG. 17 is a fragmentary perspective view of a portion of FIG. 16;

FIG. 18 is a sectional view taken along the line 18—18 of FIG. 1;

FIG. 19 is a fragmentary sectional view of mechanism used during a round-off operation;

FIG. 20 is a fragmentary sectional view of mechanism used during a clear operation;

FIG. 21 is a fragmentary sectional view showing apparatus for locking the total-bail;

FIG. 22 is a sectional view similar to FIG. 21 but showing the apparatus during a transfer operation;

FIG. 23 is an exploded perspective view of an accumulator cluster;

FIG. 24 (on the sheet with FIG. 32) is a pulse timing diagram;

FIG. 32 is a diagrammatic view illustrating a typical carry operation;

FIG. 34 is a view similar to FIG. 18 with parts removed and other parts in different operating conditions;

FIG. 35 is a fragmentary sectional view similar to the FIG. 10 but with parts removed and other parts shown in a different operating condition;

FIG. 36 is a fragmentary view illustrating a power drive mechanism used during the transfer operation; and FIG. 37 is a view of the apparatus for transferring the accumulated products to the printing mechanism of the accounting machine.

Figure 3:
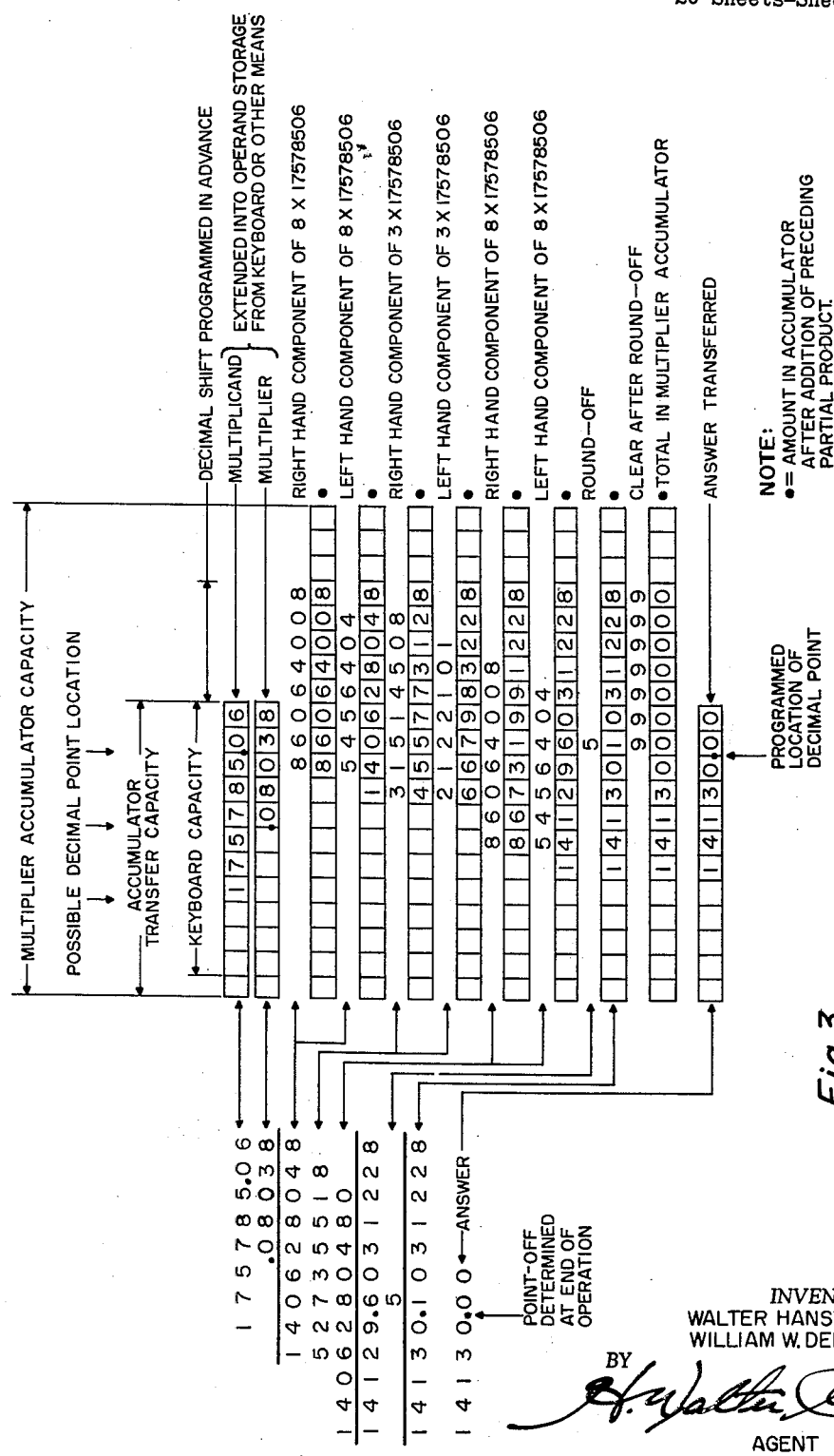
FIG. 3 illustrates a typical multiplication problem.
Figure 7:
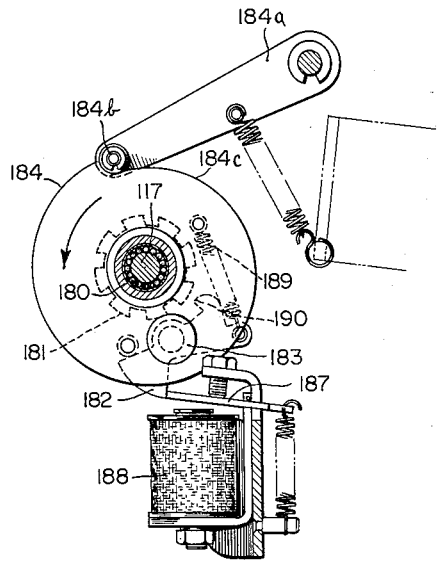
FIG. 7 is a sectional view taken along the line 7—7 of FIG. 6.

In order to set forth the invention so that it may be clearly understood by those skilled in the art, a preferred embodiment thereof has been illustrated in association with an accounting machine of the type shown and described in the above identified Butler patent, but it is not intended that its use be so limited. Alterations have been made and attachments added to the machine, making possible its automatic performance of multiplication in addition to its normal functions. The numbers to be multiplied, the multiplicand and the multiplier, are entered into the keyboard of the basic machine, or may be taken from accumulators or crossfooters in the machine. The two amounts are each stored in banks of electrical switch assemblies by means of the add racks in the machine, each switch assembly being associated with one of the add racks. Each digit of each amount is represented by the closure of normally open contacts, each corresponding to one of the digits from 0 to 9 and only one in each assembly is closed at any given time. Details of such a switch bank are disclosed in the above identified Jones et al. application.

Multiplication System

The multiplication system used by the machine makes use of the right and left hand components method of multiplication and the summation of the partial products so generated in the accumulator of the present invention. The multiplicand is multiplied successively by each digit of the multiplier by means of a multiplying unit such as that forming the subject matter of the above-identified Bradshaw et al. patent application. The partial products are passed on to the accumulator in the form of electrical pulses from a pulse generator associated therewith. The accumulator functions electro-mechanically to add the partial products which are read into it and then mechanically to transfer the total through the add racks into the accounting machine. While not necessarily so limited the accumulator illustrated in this application has a capacity of 20 digits. This machine adds at the rate of five 20 digit numbers per second.

The present accumulator includes mechanism to perform the following listed operations, and in the manner described under the same heading in the following description:

(1) Summation of partial products
(2) Round-off
(3) Clear after round-off
(4) 20 column clear
(5) Transfer of the total into the basic machine

1. Summation of Partial Products

Now with reference to the drawings, and particularly to FIG. 36 it is seen that the accumulator 50 is positioned at the rear of the basic machine 51, and is supported on the machine by means of end plates 52 and 53 (FIG. 1), the pulse generator 55 (FIG. 8), and the drive means 56 (FIGS. 4 and 6).

1A. Digit Indicating Clusters

Figure 15:
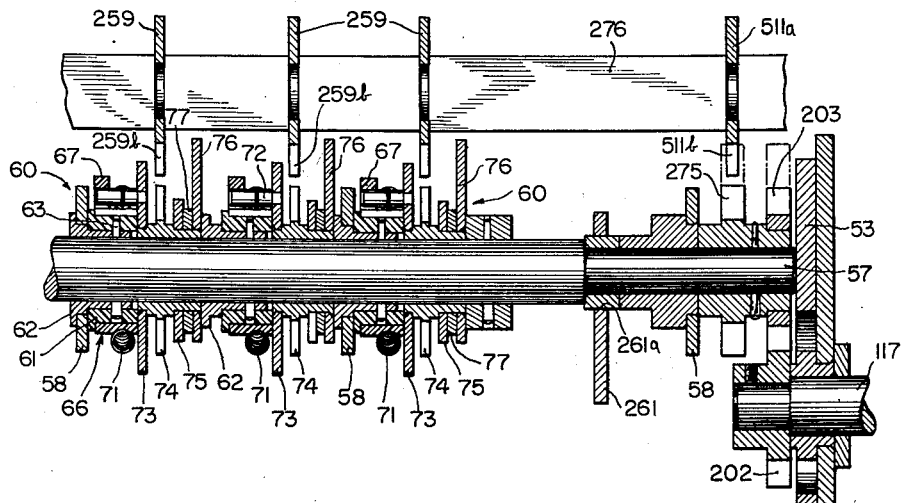
FIG. 15 is a sectional view taken along the line 15—15 of FIG. 11.

The main accumulator shaft 57 is mounted between end plates 52 and 53 (FIG. 1) on a number of arms 58, journalled on a shaft 59. Rotatably mounted on shaft 57 is a plurality of accumulator clusters 60—twenty in the presently illustrated embodiment—each representative of one digit of a product of multiplication. As seen more clearly in FIGS. 15 and 23, also see the above identified Haustein application, each cluster comprises a drum or sleeve 61 mounted upon a bushing 62, both fixed to shaft 57 by pin 63, and preferably formed of nylon. Mounted on the drum is a ring like clutch member 66, also preferably formed of nylon, and having a radially extending lug 67 and a peripheral groove 68. Member 66 is in the form of a split or discontinuous ring with its ends slightly spaced apart to provide a clearance or gap 70 which permits the ring to be drawn tightly around drum 61 by a coil spring 71 positioned in groove 68 with its ends secured to a pin 72 on a ten toothed "ratchet" wheel 73. The pin extends axially and is trapped in an aperture or slot in lug 67.

From the above description it will be understood that when drum 61 is rotated by shaft 57, clutch member 66, which is clamped securely thereto by spring 71, will tend to follow the drum during its rotation in either direction, turning ratchet wheel 73 in the same direction by pin 72, forward or backward, in accordance with the direction the drum takes.

Fixed to ratchet or digit wheel 73 in any suitable manner, such as swageing or spinning, is a pinion gear 74 having ten teeth, one for each tooth 73a of ratchet wheel 73, and each representing one of the digits from 0 through 9. Attached to the other side of pinion gear 74 in suitable manner, such as spinning or swageing, is a "carry" cam 75 and a "total" or "clear" arm 76, the purposes of which will be explained hereinafter, and each spaced from the other by a washer 77. Thus it is seen that each complete cluster is so arranged that all of its parts rotate together with shaft 57 unless such rotation is inhibited by some external source.

Figure 12:
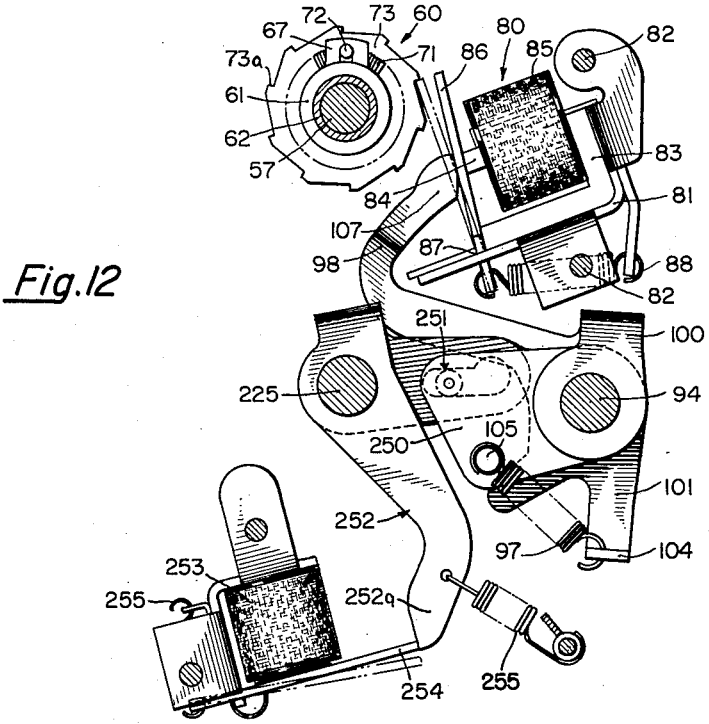
FIG. 12 is a view similar to FIG. 10 but with parts removed and with the mechanism in a different operational condition.
Figure 13:
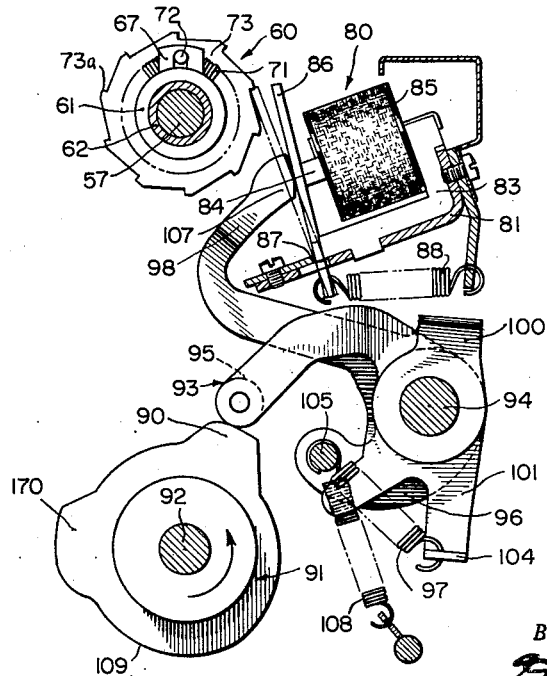
FIG. 13 is a view similar to FIG. 11 but with the parts removed and with other parts in different operational conditions.
Figure 14:
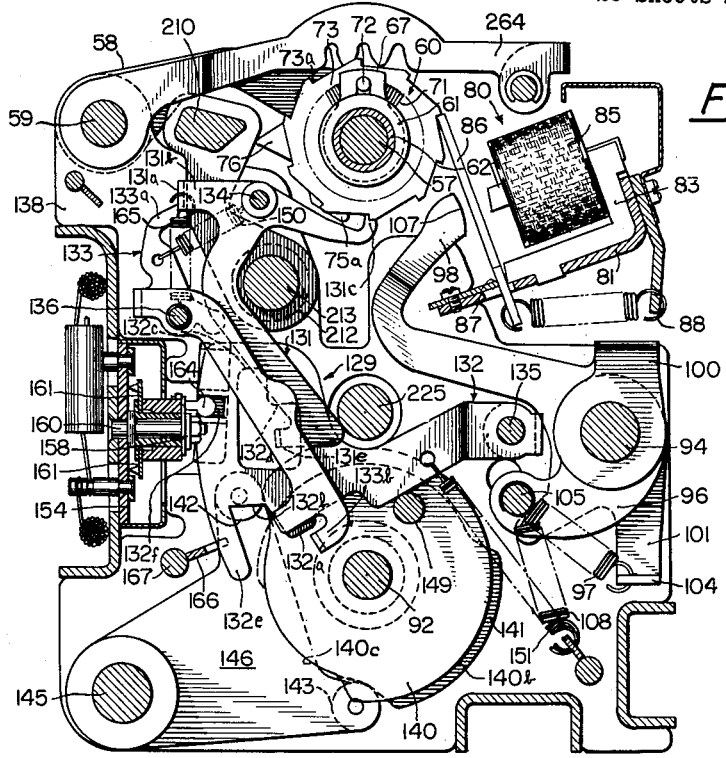
FIG. 14 is a sectional view taken along the line 14—14 of FIG. 1.

As clearly seen in a number of the views, for example, FIGS. 1 and 10 through 16, each gear cluster has a solenoid 80 associated therewith. As seen in FIG. 13 the solenoids are supported upon an angle bar 81 extending between end walls 52 and 53 and attached thereto, as seen in FIG. 1, by screws 82. In addition to providing means for supporting the solenoids, bar 81 also serves to stiffen and strengthen the entire accumulator unit. Each of the solenoids is secured to and supported on angle bar 81 by means of an angle member 83, nested and secured within the angle of the bar. Each solenoid comprises a core 84, windings 85 and a clapper 86, the latter being pivotally mounted as at 87 on angle bar 81 and normally biased in a counterclockwise direction by a spring 88, thus to engage a tooth of ratchet wheel 73, as seen in FIG. 14, when released from the solenoid.

At the beginning of each cycle of the machine, and with reference to FIGS. 1 and 13, it will be seen that the high point 90 on a cam 91 secured to the main cam shaft 92 has rotated a crank arm 93 pinned to shaft 94 in a clockwise direction to rotate the shaft in the same direction. The ends of shafts 92 and 94 are journalled in end plates 52 and 53, and crank arm 93 is provided with a cam follower 95 to follow the contour of cam 91. A curved actuator arm 96 pinned to shaft 94 is also moved in a clockwise direction and through coil spring 97 effects movement of clapper reset bail 98 in the same direction. A bail 98 is provided for each solenoid and all are journalled on shaft 94 which passes through portions 100 and 101 of each arm (FIG. 1).

One end of each spring 97 is secured to the lower end 104 of leg 101 and its other end to a bail 105 passing through and carried by the outer end of arm 96, thus to provide a resilient interconnection between bail 98 and shaft 105. While shaft 105 may be a single shaft extending across all of the legs 101, in the presently described apparatus, and as seen in FIGS. 1 and 17, it is formed in two parts, each extending across only a portion of the accumulator with a gap 106 therebetween. Two arms 96 support the short left portion of the shaft (see FIG. 1), while a number of arms are interspersed along the longer right hand portion. The gap between these shafts provides clearance for a crank arm (260) seen in FIGS. 16 and 17, and to be described hereinafter. To reduce torsional deflections in shaft 94 two actuating arms 93 (see FIG. 1) have been provided. The hubs 102 and 103 of crank arms 93 and curved actuator arms 96 are disposed between legs 100 and 101 of arms 98.

Clockwise movement of bails 98, as seen in FIG. 13, moves their ends 107 against clappers 86 mechanically to push the clappers against cores 84 of the solenoids. The resilient inter-connection of arm 96 and bail 98 afforded by spring 97 imparts a degree of tolerance in the movement of bail 98 making the production assembly thereof much simpler. For example, if a clapper contacts its armature before completion of the travel of cam follower 95 to the high point of cam lobe 90 on cam 91, further movement of arm 93 by the cam will merely stretch the spring 97. Thus it is seen that the above described construction provides a safety override feature preventing damage to the parts under certain adverse conditions.

Immediately upon the beginning of a machine cycle, shaft 92, by means described hereinafter, rotates cam 91 in a counterclockwise direction, permitting cam follower 95 under the urge of spring 108, to drop to the low portion 109 of the cam, as shown in FIG. 1. Thus it can be seen that through arm 93, shaft 94 and arm 96, bail 98 is moved away from clapper 86 permitting each of the latter, as urged by spring 88, and if not otherwise inhibited, to move rapidly in a counterclockwise direction to engage a tooth 73a of wheel 73, thus to prevent the latter's rotation with shaft 57. A delay as between the rotation of shafts 57 and 92 permits the clapper to engage wheel 73 before it rotates a tooth past clapper 86. This delay is provided by intermittent drive means, described below. Bushing 62 and drum 61 of each cluster will rotate with shaft 57 but clutch 65 will slip relative to the drum because there is insufficient torque between the drum and the clutch to overcome the inhibiting force of the clapper. If none of the solenoids are energized, all of the clappers will drop out to thus retain all of the clusters in their normal "0" indicating position at the start of a multiplication operation. In this regard, it will be noted in FIG. 23 that the outer periphery of clutch member 66 may be marked to indicate the digits "0" through "9" and the number in each cluster will appear adjacent the top for ready reading during servicing operations, such position being hereinafter referred to as the "up" position.

On the other hand, if solenoids are energized in the manner set forth in the Bradshaw et al. application identified above, when the high point of cam lobe 90 moves from beneath cam follower 95 permitting bail 98 to move away from the clapper, as just described, each energized solenoid will retain its clapper 86 against its core 84, permitting the cluster 60 associated therewith to rotate with shaft 57. Now considering one cluster by way of example, and with reference to FIG. 13, and assuming that at the start of the cycle the cluster is in its "0" indicating position, that is, with the "0" on clutch element 66 facing "up," if shaft 57 is advanced 1/10 of a revolution and it is not inhibited by the clapper dropping away from the solenoid, digit wheel 74 will be in its number "1" position, and the numeral "1" will be "up." Subsequently, if its rotation is not inhibited at that point, ratchet wheel 73 will continue rotating through tenths of a revolution until solenoid 85 is de-energized, at which time clapper 84 will fly out under the urge of spring 88 to engage the ratchet wheel and stop it at a selected number. For example, the pulse generator, one form of which is described hereinafter, is so designed that a "4" pulse will be of such duration that it will hold the solenoid energized, retaining the clapper against its core 84, until three teeth of wheel 73 have passed, after which the clapper will be released to fly out into engagement with the wheel and stop it at the fourth tooth, placing it in the number "4" position. Thus, it can be seen that a pulse corresponding to any of the digits "1" through "9" will correspondingly position one or more of the gear clusters.

Under another condition during the summation of partial products, if a cluster is in its number "7" position and a "4" is added to it on a subsequent cycle of the machine, beginning a "carry" problem to be explained hereinafter, wheel 73 rotates four more steps, at which time the clapper will fly out to engage the wheel at the "1" position, as "7 plus 4 equals 11." The other "1"— the left hand component—involves the problem explained hereinafter under the heading "Carry."

Thus as the various solenoids are selected—up to twenty, the number contemplated for use in the present embodiment—it is possible to register a total of a multiplying operation to be transferred to the printing apparatus of the basic machine by apparatus such as shown in FIG. 37 and described hereinafter under the heading of "Transfer."

*1B. Pulse Generator*

While in the business machine art the apparatus now to be described is loosely termed a "Pulse Generator" it might be more aptly termed a "Pulse Timer," as in fact its primary function is to interrupt current passing through a plurality of distinct circuits in a manner thereby selectively to de-energize solenoids 80 after a predetermined selected time interval indicative of the digits "1" through "9."

Figure 8:
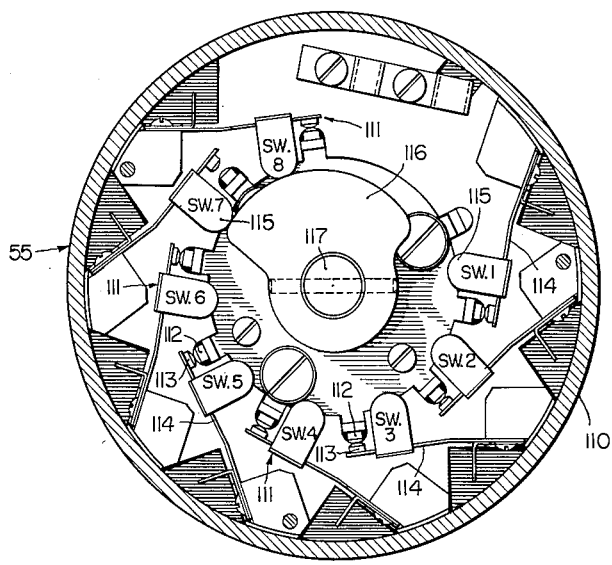
FIG. 8 is a sectional view taken along the line 8—8 of FIG. 6 and showing the pulse generator.

More specifically and with reference to FIGS. 8 and 24 it will be seen that the pulse generator 55 comprises a circular housing 110 having attached thereto about its inner periphery a plurality of normally closed switches 111 further identified by their digit value SW–1 through SW–8—the "9" pulse is generated in another manner as described below. Each switch 111 comprises a fixed contact 112 and a contact 113 carried on a flexible leaf 114. Also carried by the leaf is an actuating projecting or button 115 extending radially inwardly in the path of rotation of an actuator cam 116 fixed to the end of the drive shaft 117. Rotation of shaft 117 in a clockwise direction, as seen in FIG. 8, causes cam 116 successively to contact buttons 115 thus to separate switch contacts 112 and 113 and break the switch, see switch SW–7.

In its operation and with reference to FIG. 24 and to those portions of FIG. 2 entitled "Current to Pulse Generator" and "Pulse Generator Contact Openings," it will be seen that no current is applied to the pulse generator until its enabling cam 118 closes switch 119. Cam 118 is mounted on a shaft 120 and has two switch actuating lobes 121 and 122, one to actuate switch 119 for entry of the right-hand components, and the other to actuate the switch for entry of the left hand components, as more fully described hereinafter.

As shown on the diagram of FIG. 24 switch 119 closes after 30 degrees of rotation of each complete cycle of the machine, at which time all of the switches 111 are closed. Continued rotation of actuator cam 116 in the pulse generator then successively opens switches SW–1 through SW–8, switch SW–1 being opened at 79° of rotation and switches SW–2 through SW–8 at 96°, 114°, 131°, 148°, 165°, 183°, and 200° respectively. For reasons of convenience the "9" pulse is synchronized with the operation of cam 121 in such a way that during the period of time the cam maintains switch 119 in closed condition, substantially 191 degrees (from 30 to 221 degrees), a pulse having a time duration indicative of a "9" is established. Switch 119 opens at 221 degrees and remains open and until 30 degrees of the next cycle, after which it closes and the pulses are again established. It will be noted that switches SW-1 through SW-8 close again after a period of approximately 50 degrees. However, this is not important, because they have no further effect upon the operation of the machine until switch 119 is closed again.

From the pulse generator these nine pulse outputs are fed through switch arrangements and a multiplicand storage unit in the manner described in the above-identified Bradshaw et al. application, from which they are channelled to the accumulator solenoids 85 to stop wheels 73 in positions representative of the numerals selected.

1C. "Carry"

As mentioned above, the accumulation of partial products in the accumulator will involve a "carry" operation whereby two numbers totalling more than 9 will carry a "1" to the next succeeding digit. Mechanisms for accomplishing this carry operation will now be described.

It will be understood, of course, at the beginning of a multiplication operation the first numbers entered in the accumulator wheels will be the right-hand components of the multiplication by the first multiplier digit. These digits may all be the same but for the purposes of this description we will assume that they include different digits, for example, those indicated in FIG. 3 (9375950). As there will be no "carry" at this stage of the multiplication, the first cycle will be completed without any carry being required to correctly position the digit indicating wheels. At the beginning of the next cycle to enter the left-hand components, the first operation which occurs is a resetting of the carry mechanism 129 (FIG. 14) to the "0" condition, as described hereinafter.

Now, for the purposes of this description, consider the addition problem indicated in FIG. 32 wherein left-hand components 0922076 are being added to the right-hand components 9375950. These components have been selected to illustrate all conditions of the "carry" mechanism as described below, and are not to be considered the result of a specific multiplication problem. They may be considered illustrative of any general addition problem.

Figure 30:
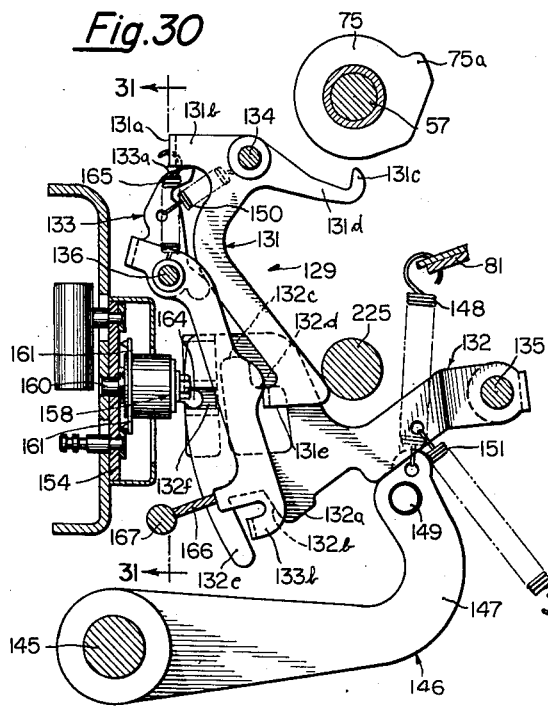
FIG. 30 is a view similar to FIGS. 26 and 28 but showing the mechanism in still another operating condition.
Figure 31:
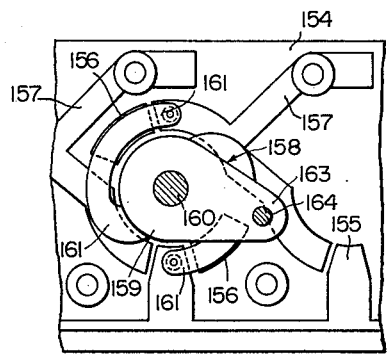
FIG. 31 is a sectional view taken substantially along the line 31—31 of FIG. 30.

Each digit cluster has a carry mechanism 129 associated therewith, and each of the carry mechanisms includes three elongated members or arms 131, 132 and 133 pivotally mounted on shafts 134, 135 and 136 respectively, all of the latter extending across the machine through plates 138 between each cluster (FIGS. 1 and 14). For the purpose of clarity in the following description, arm 131 will be described as "T-shaped," arm 132 as "hatchet arm," and arm 133 as "control arm." All three of the arms are peculiarly shaped to permit them to assume different relative positions indicative of various conditions of the accumulator wheels, such positions including a "number" position (FIG. 26), an "on 9" position (FIG. 28) and a "carry" position (FIG. 30). With reference to these figures, the mechanism will now be described.

A pair of complementary cams 140 and 141 (FIG. 26) are secured to opposite ends of the main cam shaft 92, and each pair of cams has a pair of cam followers 142 and 143 associated therewith respectively. The cam followers are carried by a rocker arm 144 pinned to a shaft 145 extending across the accumulator with its ends journalled in end plates 52 and 53. The above described arrangement of the cams and cam followers provide a positive drive in either direction to rock or oscillate shaft 145. Also attached to this shaft for rocking movement therewith is an arm 146 having a curved or hooked end 147 to which is secured a spring 148 for biasing the arm in an upward or counter-clockwise direction in order to reduce torsional deflections in shaft 145. Rocking of cam follower arm 144 by rotation of cams 140 and 141 oscillates shaft 145 to raise and lower hooked or curved arm 146 in a manner to cause a pin or bail 149 secured to its outer end to raise and lower hatchet arm 132 for the purpose described hereinafter. Because of various elements, including cams 140 and 141, occupying positions preventing it, bail 149 cannot be a continuous shaft in this embodiment of the invention. Therefore, throughout the accumulator a sufficient number of curved arms 146 are supplied to provide a bail 149 to operate the hatchet arm 132 of each digit cluster. It will be understood that with each complete cycle of the apparatus cams 140 and 141 rotate through a complete revolution, raising and lowering hooked arm 146 between extended and retracted positions.

At the beginning of the initial cycle of the machine, as described above, the accumulator apparatus is in the condition illustrated in FIG. 14, with cam follower 142 adjacent the top of cam lobe 140a. Initial counter-clockwise rotation of cams 140 and 141 will move cam follower 142 to the high point of lobe 140a rocking shaft 145 in a counter-clockwise direction to move arm 146 and thus bail 149 upwardly against the underside of hatchet arm 132 to pivot the latter upwardly about shaft 135. During the initial cycle of the machine the various carry mechanisms may assume either the "number" or "on nine" condition mentioned above, but, as there is no carry on this cycle, this is of no consequence insofar as the operation of the mechanism is concerned. However, it is important in connection with subsequent cycles, as will be fully described below.

In FIG. 2 under the title "Carry Sensing Bail," which bail has been numbered 149 in this application it will be seen that during each cycle the first 16 degrees of cam shaft rotation effects movement of cam follower 142 to the top of lobe 140a where it remains for the next 23° at which time the cam contour drops to surface 140b, permitting arm 132 to return to the position illustrated in FIG. 14. Cam surface 140b is generated about a radius returning arm 146 to approximately the position in which it was found at the initiation of the cycle (FIG. 14). In other words, the rise of cam follower 142 to the top of cam lobe 140a is very nearly equal to its drop from the top of lobe 140a to cam surface 140b. In this cam shaft position, upper end finger 133a of control arm 133 is urged by spring 150 against an inwardly turned end portion 131a of a leftward extension 131b of arm 131, thus retaining or latching arm 133 in the position illustrated. The latching arm is retained in this position for all but the "on nine" condition of the mechanism. The accumulator mechanism is now in its "reset" condition.

During succeeding cycles of operation the right and left-hand components are entered into the accumulator. However, at this point in the description, the right-hand components having been entered, the left-hand components "0922076" are now entered, see FIG. 32, and the mechanism is in condition for a "carry" operation. In this condition the carry mechanisms will be in all of the different conditions mentioned above, indicating either a "number," an "on 9" or a "carry."

Figure 26:
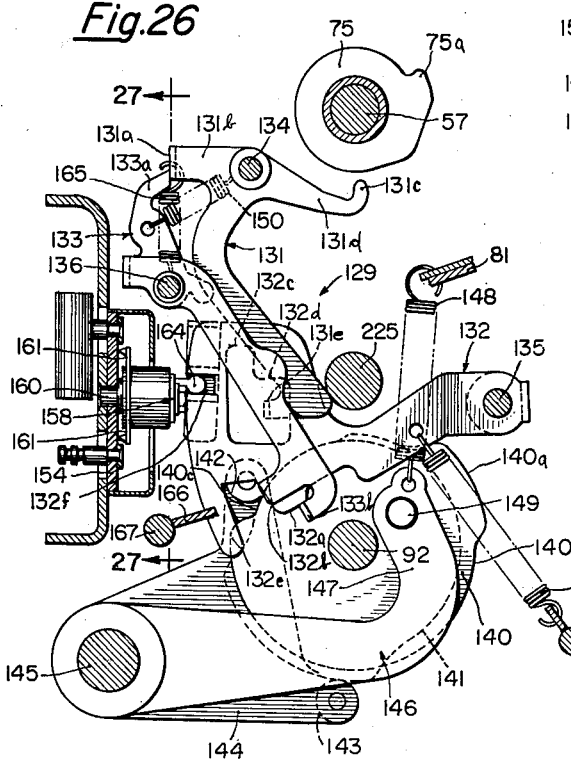
FIG. 26 is a sectional view similar to FIG. 14 but with parts removed and other parts shown in different operating conditions.

First consider the mechanism when a "number" condition exists ("0" through "8"), but more specifically the problem of adding the left-hand component of "2" to the right hand components of "5" (column 4 of FIG. 32). With reference to FIG. 26, it will be seen that carry cam 75 is positioned with its lobe 75a projecting to the right at a clock position of 3 o'clock, the digit "7" position. In the "reset" condition as seen in FIG. 14 lobe 75a is positioned in the "0" position just to the left of the hooked end 131c of the rightward extension 131d of T-shaped arm 131. As rotation of cluster 69 is basically in a clockwise direction, during the first cycle the lobs will rotate five-tenths of a revolution to the "5" position, and during the second cycle it will rotate an additional two-tenths to the "7" position, a total of seven-tenths of a complete revolution, at which time it will be stopped by its associated clapper 86. As mentioned above, completion of the machine cycle with a cluster in a "number" condition makes no significant change in the carry mechanism over that shown in FIG. 14. The only difference is that curved arm 146 and its carry sensing bail 149, have moved to a lower position by reason of cam follower 142 moving to cam portion 140c (FIG. 26). This permits hatchet arm 132 to drop to a position wherein a depending projection 132a engages a turned end portion 133b on arm 133, as urged by spring 151.

Figure 27:
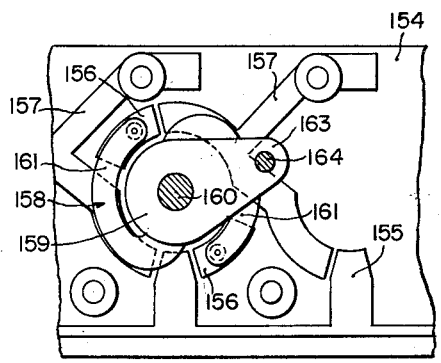
FIG. 27 is a sectional view taken along the line 27—27 of FIG. 26.
Figure 29:
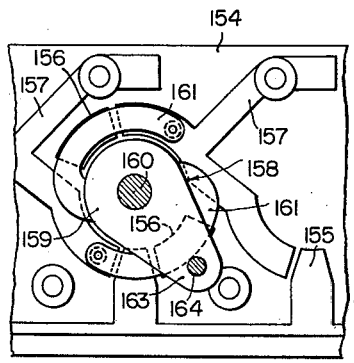
FIG. 29 is a sectional view taken along the line 29—29 of FIG. 28.
Figure 28:
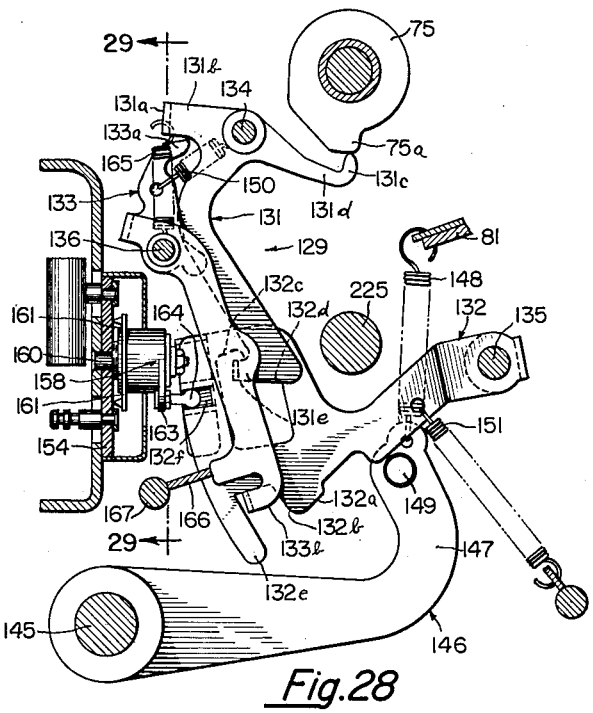
FIG. 28 is a sectional view similar to FIG. 26 but showing the apparatus in a different operating condition.

Carry from one column to the next is performed electrically and instantaneously and consequently the carry might be said to be "simultaneous." The electrical portion of the carry mechanism comprises a printed circuit network as shown fragmentarily in FIGS. 25, 27, 29, 31 and 32. The printed circuit panel 154 includes a common input conductor 155 and a plurality of conductor segments, of which those identified by the numeral 156 are dead, and those identified by the numeral 157 are those which when coupled to conductor 155 by a wiper contact element 158 activate solenoids 80 to effect a "carry" operation of the digit clusters. The position of wipers 158 on conductor elements 155, 156 and 157 determines whether or not a "carry" will be made and the position of the wiper is determined by the position of hatchet arm 132. As shown in FIGS. 27, 28 and 29 each wiper 158 comprises a base element 159 rotatably mounted on a post 160 and having secured thereto arcuately shaped interconnected contact wiper elements 161 made of spring metal to bias their contacts firmly against the printed circuit conductors. Base 159 includes a radial extension or finger 163 carrying a stud 164 extending into a notch 132f in hatchet arm 132, see FIG. 28. Thus it is seen that movement of hatchet arm 132 upwardly or downwardly carries stud 164 with it, thereby rotating wiper contacts 161 over the printed circuit elements to establish the necessary circuitry for the "carry" operation.

Figure 25:
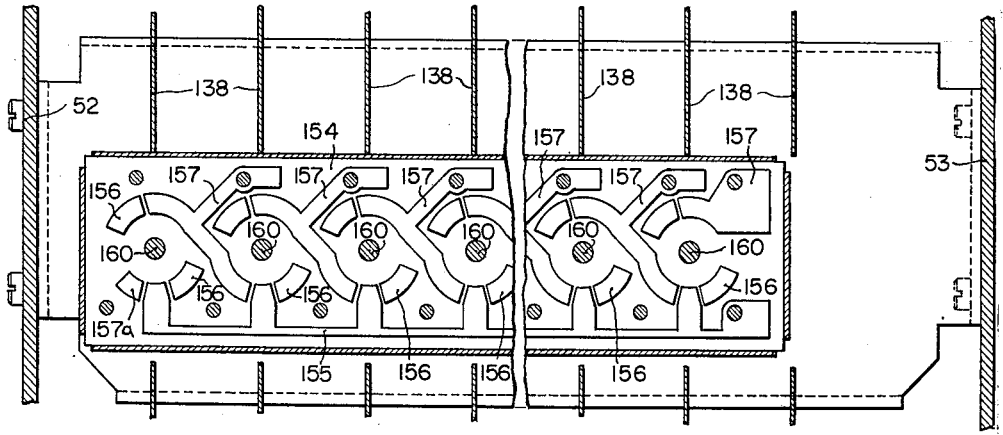
FIG. 25 is a sectional view taken along the line 25—25 of FIG. 10.

FIGS. 25 and 32 show the "carry" circuitry from the back of the machine, therefore, it should be understood that "carry" is to the right in these figures rather than to the left, as is normal when looking from the front. In FIG. 32 it can be seen that the "Total" in the first column is a "9." Of course, as this position is the first or right-hand column in a multiplication problem, when looking from the front of the machine, there will never be a "carry" situation because all subsequently added components will be shifted to the left of this digit. The sum of the left and right hand components in the second column is "12," therefore there will be a carry of the "1" to the third column, the total of which without the carry is "9." However, the carry of "1" changes the "9" to a "10," necessitating a carry to the fourth column, changing its "7" to an "8" with no carry. In the fifth column the total is "9," therefore no carry will be necessary. However, in the sixth column we again have a "12" which will carry to the seventh column, making the "6" in this column a "7." Thus it can be seen that prior to the carry operation the carry mechanisms will be in one of the three conditions mentioned above. Columns four and seven will be in a "number" condition, columns one, three and five will be in an "on 9" condition, while columns two and six will be in the "carry" condition.

Still with reference to FIG. 32, it will be seen that when the total of right and left-hand components is a "number," wiper 158 will be bridging dead contacts 156, as shown in the fourth column where the number is a "7." Where the total is a "9," wiper 158 normally is across conductors 157, ready to transfer a "carry" to the next column if it receives a carry from the preceding column, as indicated in the second and third columns. It will be noted in connection with the "on 9" condition of wiper 158, that in the first column it is in an "on 9" condition, but contact 157a is a dead contact because no carry is ever possible from this first column during a multiplication problem. When a wiper is in a carry condition, as indicated in columns two and six where the total of the right and left hand components is "12," it is bridging conductor 155 and a conductor 157 closing the circuit between conductor 155 and ground through the solenoid in the third and seventh columns thus to hold their clappers for an additional one tenth rotation of wheel 73 to effect a carry of the "1" in the second and sixth columns to the "9" in the third column and the "6" in the seventh column. Increasing the "9" in the third column to a "10" effects a carry through wiper 158 in that column to the "7" in column four, increasing the latter to an "8," a "number" condition; therefore no carry is called for in the fourth column and the wiper associated with that column is bridging dead contacts 156. Thus, it can be seen that the three conditions of the "carry" mechanism are necessary to effect a complete and simultaneous "carry" operation of the mechanism.

The above described "carry" mechanism 129 is for the purpose of setting wipers 158 in their proper relationship with the printed wiring when these various conditions are required. When in the above-described "number" condition, wiper 158 is bridging dead contacts 156 during which time T-shaped arm 131 maintains control arm 133 in its latched condition, as shown in FIG. 14. There is a slight movement of contacts 161 during resetting and setting of the mechanism in the "number" condition by reason of contact therewith of stud 149 on hooked arm 146 during upward movement of the latter. One effect this movement has is beneficial as it serves to keep the wiper contacts clean by rubbing them over dead conductors 156.

The "on 9" condition is illustrated in FIG. 28 and here it is seen that carry cam lobe 75a is in a depending position at 6 o'clock and has rotated T-shaped arm 131 in a clockwise direction, thus to move its leftward extension 131b upwardly away from end finger 133a of control arm 133, permitting the latter to rotate in a clockwise direction, as urged by spring 150. The lower inturned end 133b is moved to the left in registry with a cut-out portion 132b of hatchet arm 132, permitting the latter to rotate downwardly in a counter-clockwise direction when bail 149 is rotated downward and as urged by spring 151, until end 133b of control arm 133 stops it by engagement of the end with the top edge of a cut out portion 132b. It will also be seen that an inturned end 131e of arm 131 has moved to the left in registry with a cut-out portion 132c of hatchet arm 132 away from ledge 132d, which latter would prevent the hatchet arm from moving to its lowermost position, as shown in this figure. Movement of hatchet arm 132 to this position rotates wiper arm 158 in a clockwise direction to the position shown in FIG. 29 wherein its contacts 161 are bridging circuit conductors 157 of the printed wiring circuit, as shown in columns one, three, and five, in FIG. 32.

In conditioning the mechanism for "carry," lobe 75c of carry cam 75 must have passed from or through the "on 9" condition to unlatch control arm 133 by rotating T-shaped arm 131 in a clockwise direction by lobe 75a, as described above in connection with the "on 9" condition. As shown in FIG. 30, illustrating the mechanism in a "carry" condition, lobe 75a has passed through the "on 9" condition, releasing control arm 133 to be rotated in a clockwise direction to the right. As soon as lobe 75a has passed through the "on 9" condition, T-shaped arm 131 will return to its normal position as urged by spring 165, thus returning its end 131d to a position in which it will engage ledge 132d to halt the downward movement of hatchet arm 132 in a position wherein it has rotated wiper arm 158 to the condition shown in FIG. 31, with its wiper contacts 161 bridging common conductor 155 and a live conductor 157, see columns two and six of FIG. 32. In this regard it will be seen that the lower inturned end 133b of control arm 133 has again moved to the left in registry with the cut-out portion 132b of hatchet arm 132 out of the way of the movement of the hatchet arm. Clockwise movement of control arm 133 is stopped by contact thereof with the edge of a comb plate 166 extending from a rod 167 the ends of which are secured to end plates 52 and 53. A depending finger member 132e rides between the tines of the comb to guide the hatchet arm in its movement and to maintain its alignment with the other arm members of the carry mechanism and with wiper stud 164.

It will be remembered that prior to the carry operation, all of the digit wheels 73 have been stopped by clappers 86 at various digit indicating positions during the first 240° of the cycle as indicated in FIG. 2 under the title "Accumulator Wheels." To effect the additional 1/10 rotation of the wheels for a carry operation, it is necessary to reset the clappers, that is, move them away from wheels 73 to permit the latter to rotate through the additional 1/10 revolution. Through a suitable intermittent drive means, described more completely hereinafter, shaft 57 first rotates in a reverse direction beginning at 240 degrees of the cycle, thereby to provide a gap or clearance between the ends of the clappers of those solenoids which are not energized and the ratchet wheel tooth which it returns to arrest. This latter clapper movement is accomplished by and through the same apparatus as described above with reference to FIG. 13, but actuated by a carry lobe 170 on cam 91, and at 272° of its cycle, as indicated in FIG. 38 under the title "Clapper Reset Bail," retaining the clappers in this condition until 296°. Still with reference to FIG. 38 and under the title "Carry Pulse," it will be seen that suitable means such as switch 171 (FIG. 32), controlled by cam 172 will close the carry circuit thus to energize those solenoids conditioned for a carry operation as described above. At 296° follower 95 on crank ram 93 drops off of lobe 170, permitting reset bails 98 to return to their retracted positions. During this latter movement, those clappers associated with unenergized solenoids where there will be no carry will follow the reset bail in a counter-clockwise direction again engaging the dgit wheel tooth with which it was engaged prior to the initiation of the carry operation. Of course where a solenoid has been energized in accordance with the established circuitry described above, its clapper will remain in advanced position against the solenoid. The carry circuit is maintained closed by cam 172 until 340° of the cycle, but prior to this and at 316° the rotation of digit wheels 73 which is counter-clockwise from 240° to 316°, as described below, is reversed and they again begin to rotate in a clockwise direction, advancing those digit wheels free to rotate the additional one tenth revolution where rotation is stopped by the clappers 86 dropping out at 340°, about midway between the beginning and end of the final one tenth revolution.

1D. Drive

With reference to FIG. 4, diagrammatically illustrating a suitable drive mechanism for the apparatus of the invention, and also to FIG. 6 showing its actual construction, it should first be understood that shaft 57 and main cam shaft 92 may be rotated at any suitable speed, but that 300 r.p.m. has been found quite suitable. It is also now understood from the above description that each rotation of shaft 57 has intermittent periods of reverse and forward speeds. The drive for effecting this shaft rotation will now be described.

The drive shaft 117 to which pulse generator cam 116 is fixed, has a pulley 176 freely rotatable thereon and driven in a clockwise direction—as seen in this figure—by a motor 177 through suitable means such as pulley 178 and belt 179. Secured to the hub 180 of pulley 176 is a toothed wheel 181 forming a part of a one revolution clutch mechanism comprising a dog 182 pivotally mounted by pin 183 on flange 184 carried by hub 185 of a gear 186 rotatably mounted on shaft 175. Dog 182 is held in its retracted position, as illustrated, by the clapper 187 of a solenoid 188, and is normally biased in a clockwise direction by a coil spring 189.

Energization of solenoid 188 draws its clapper 187 downwardly and removed from the path of movement of dog 182, thereby permitting spring 189 to move the toothed end 190 of the dog into engagement with toothed wheel 181, thereby tying them together for rotation at the same speed. Rotation of the dog also causes clockwise rotation of gear 186 at the same speed. Gear 186 is in driving engagement with a gear 191 of the same size and rotatably mounted on a jack shaft 192 by hub 193, the other end of which carries a gear 194 which is in driving engagement with a similarly sized gear 195 for rotating cam shaft 92 at 300 r.p.m. in a clockwise direction.

As long as tooth 190 of dog 182 is in driving engagement with wheel 181, the gear assembly just described will rotate constantly at 300 r.p.m. However, when solenoid 188 is de-energized, its clapper 187 will move into the path of rotation of dog 182 and upon contact therewith cause it to rotate in a counterclockwise direction about pin 183 thus to disengage it from wheel 181 and stop gear 186. To prevent the dog spring 189 from rotating flange 184 a few degrees backward and causing chatter of the dog on toothed wheel 181, a pivotally mounted antibackup arm 184a drops its roller 184b in step 184c of the flange. The clutch output is then positively locked into its zero position with the spring urging the step 184c against roller 184b and dog 182 against clapper 187.

Fixed to the other end of hub or sleeve 185 is an arm 196 comprising the drive element for the intermittent motion mechanism indicated generally by the numeral 197. Pivoted to the outer end of arm 196 by pin 198 is a crescent shaped gear segment 199 having teeth 200 on its lower inner edge engaging a gear 201 pinned to shaft 117.

From the above description, it will now be understood that engagement of dog 182 with wheel 181, will, through the gear assembly and intermittent drive means 197 rotate shaft 117 at a constant velocity of 300 r.p.m., the output of which transferred by a gear 202 at its left end to a similarly sized gear 203 pinned to the end of shaft 57, thus to rotate the latter at 300 r.p.m. Of course, unless otherwise modified, each revolution of this output will be at a constant velocity. However, as described above, the rotation of shaft 57 is intermittent during each cycle, and this intermittent velocity is obtained by the intermittent drive means 197 in the manner now to be described.

Figure 9:
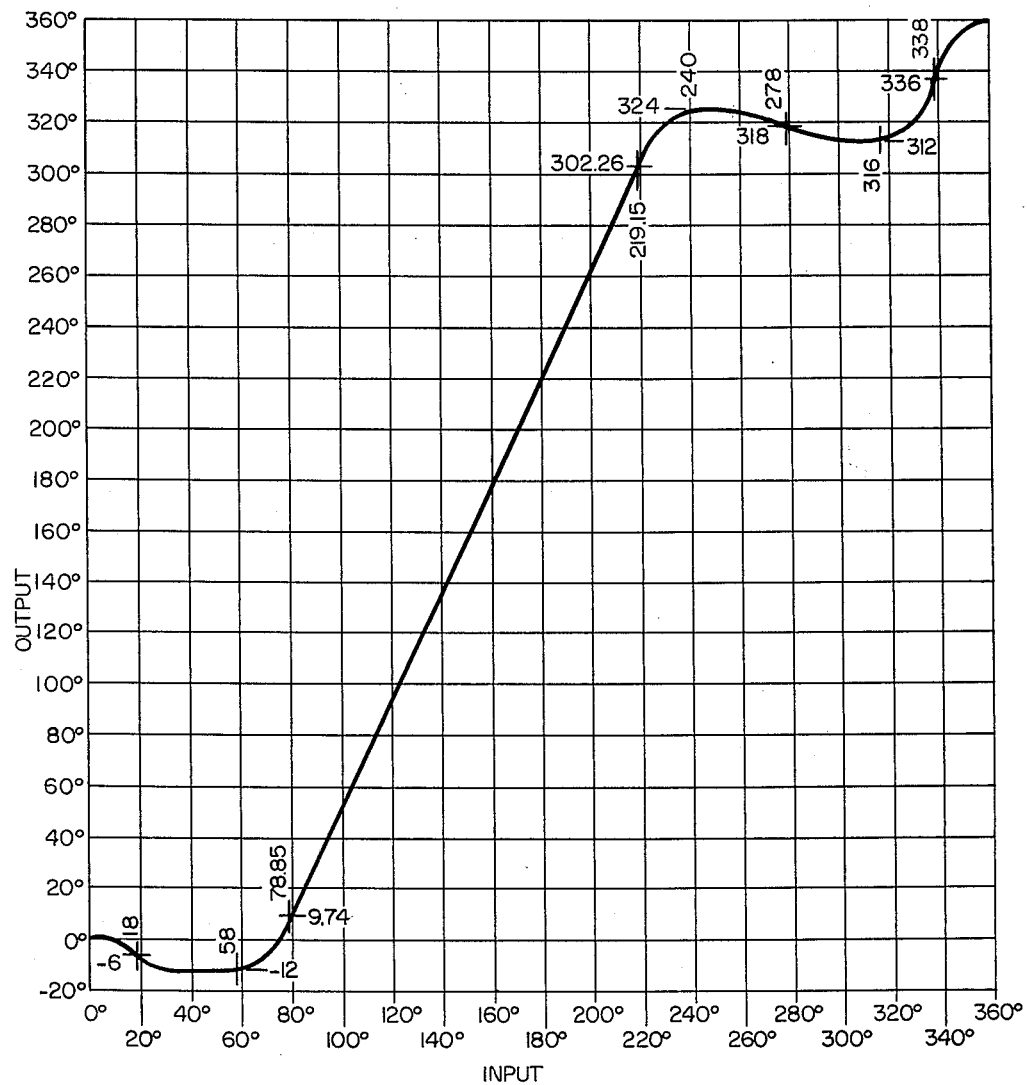
FIG. 9 is a graph diagrammatically illustrating the operating characteristics of the intermittent drive mechanism.
Figure 10:
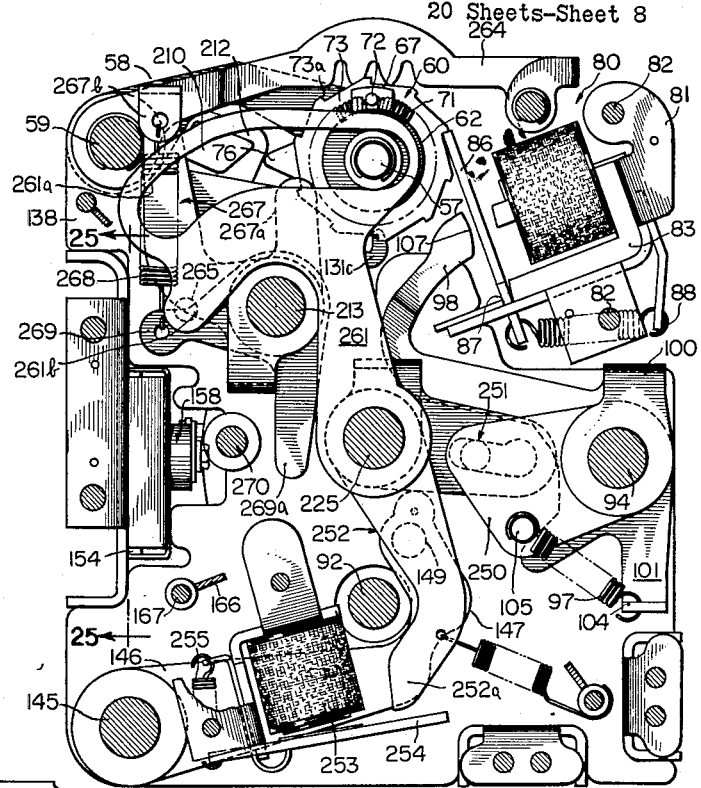
FIG. 10 is a sectional view taken along the line 10—10 of FIG. 1.
Figure 11:
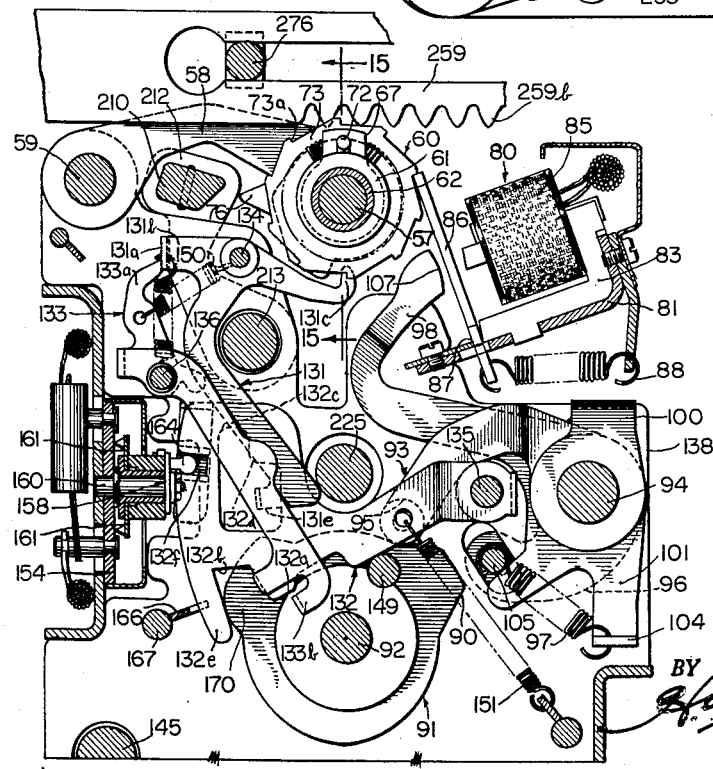
FIG. 11 is a sectional view taken along the line 11—11 of FIG. 1.

Crescent gear 199 carries a stud or pin 204 extending into an irregular cam track 205 (FIG. 5) formed by two annular shaped members 206 and 207 fixed around shaft 117. Rotation of pin 204 by arm 196, causes pivotal movement of crescent gear 199 about its pivot pin 198 to rotate gear 201 intermittently during each revolution thereof. This relative rotation of gear 201 is controlled by cam track 205 in a manner to produce a slight reverse rotation of shaft 57 both at the beginning of each cycle and just prior to the final one-tenth of its rotation as described above. With reference to FIG. 5 it is seen that pin 204 is at rest in the cam track at about eleven o'clock, its position at the start of each cycle. Rotation of the pin as described above causes it to follow the cam track in a clockwise direction. As diagrammatically illustrated in FIG. 9, plotting the rotation of a cycle of revolution of shaft 117, and consequently shaft 57, it will be seen that for the first two degrees the cam track is formed so as to cause the parts to remain at rest which condition we shall call a "dwell." From 2° to 34° pin 204 moves radially inward to position 205a of the cam track causing the gear segment to back up shaft 117 to release the clappers 86 for digit entering. From 34° to 58° there is another dwell, after which the speed of the shaft increases to its maximum at 79°, at which speed it rotates to 219° of the input shaft rotation and then its speed gradually is reduced until it reaches 240°. From 240° to 316° it backs up for the "carry" operation while pin 204 traverses low portion 205b, and then its speed increases until prior to 360° it slows down as it approaches the end of the cycle.

Round-off and Clear Generally

The apparatus of the present embodiment of the invention was designed for operation with a machine of the type disclosed in the above-identified Butler patent wherein only 12 output racks are incorporated. The present accumulator, however, has 22 electrical inputs, one to each of the 20 digit wheel or input solenoids, and two control inputs, one of the latter to control the clapper reset mechanism and the other to control the total bail mechanism, described hereinafter. Because the accounting machine with which the present accumulator is associated has only 12 output racks, the output of the present accumulator comprises only 12 of the digit clusters 60, the pinions 74 of which, during the transfer operation are moved into mesh with the racks of the accounting machine. There is no output for the remaining 8 columns of the accumulator, these being provided in the present embodiment for increased precision in the multiplication operation. It should be clearly understood, however, that any number or all of the clusters may be used during a transfer operation, depending upon the output of the basic machine with which it is associated.

If the figures being multiplied require a decimal position, such as would occur when multiplying dollars and cents, mechanism and circuitry described in the Bradshaw application locates the decimal relative to the twelve output columns which are to the left of the accumulator— when looking from the front—and all digits to the right are cleared out of the accumulator after a round off operation. The latter requires no additional mechanism, only the adding of a "5" pulse in the proper column. By way of example, consider the multiplication problem shown in FIG. 3.

In this figure each row of twenty small blocks represent the twenty "clusters" in the accumulator, and the numbers within the individual blocks are those represented by the position of the digit wheels of the clusters as the machine progresses through the successive cycles of operation. The first row of twenty blocks shows entry of the right hand components of the first right hand digit of the multiplier times the successive digits from right to left of the multiplicand, in other words 8×17578506 which equals 86064008. It will be seen that the latter number has been shifted five spaces to the right of the digits in both the multiplier and the multiplicand. Programming of this shift takes place in the apparatus described in the above identified Bradshaw application. The left hand components of 8×17578506, i.e., 5456404, is added to the right hand components on the second cycle of the machine shifted one space to the left as it would be in a normal mental or manual multiplication process illustrated on the left of this figure.

As multiplication proceeds, the right and left hand components are added in their proper column until completion of the problem just prior to "round-off," see the legend on the right hand side of this figure. In the particular problem illustrated it will be noted that the multiplicand is in dollars and cents with the decimal point two places to the left of the last digit and that the multiplier represents a five place decimal value. It is desired to have the answer expressed only in dollars and in this problem the product has been shifted five places to the right. This shift provides the answer to the multiplication problem with the decimal point in its proper place, but in certain accounting applications a round-off operation is necessary.

2-Round-Off

Round off is accomplished by adding the digit 5 in the proper column, in this instance in the tens column, as will be seen in this figure immediately below the digit 6 of the answer four rows up from the bottom of FIG. 3. Of course, adding a 5 only gives the answer the benefit of fractions greater than .5 but does not eliminate from the clusters all of the undesired digits to the right of the decimal points. Therefore a "clearing" out of the unwanted digits is necessary.

3-Clear After Round-Off

The clearing operation is accomplished by adding a 9 in all columns to be cleared in the presently illustrated example, those columns to the right of the decimal point, which will cause all digit wheels where a 9 is added to rotate past a common point if uninhibited. However, a "total bail" 210 is positioned in the path of rotation of the total-arm 76 of each cluster, at which point it is stopped with the digit wheels in their "0" positions, as indicated in the row of small blocks identified as "Total in Multiplier Accumulator."

With reference to FIGURES 19, 20 and 21 it is seen that the mechanism for accomplishing the clearing operation includes the total-arm 76, which, when a digit cluster is in a "0" indicating condition, as seen in FIGURE 19, extends to the left at 9 o'clock. It will be remembered from the above description that rotation of the total-arm is in a clockwise direction. Also, as mentioned above, during the clearing operation the total bail 210 is moved into the path of rotation of total-arm 76, whereby rotation thereof is stopped when the digit clusters are in the zero condition. Of course, the various total-arms are in different positions representative of the digits in the digit clusters, for example, as indicated by broken line 211 in FIGURE 19. Regardless of its position, however, a nine pulse is of sufficient duration to permit rotation of the cluster from any digit representing position to the zero position illustrated in this figure. If the cluster is already in a zero condition, movement of the total-bail as described above will restrain that particular cluster against any rotation. It will be understood that those clusters in which digits are to be retained will be held in their digit representing condition by their associated clappers dropping out into engagement with ratchet wheels 73. All clappers associated with columns to be cleared will be held by the energized solenoids, permitting the associated cluster to rotate until the "0" condition is reached.

Total-bail 210 traverses the full length of the accumulator and is carried upon arms 212, several of which are distributed along the length of the machine, pinned to a shaft 213, the ends of the latter being journalled in end plates 52 and 53. Rotations of total-bail 210 to its extended or advanced position, as seen in FIGURE 19, is in response to energization of solenoid 214 (FIG. 18) during the right hand (round-off) cycle of the round off and clear operation, as indicated in FIG. 2, under the heading "Current to Total Bail Solenoid." When the solenoid is energized its clapper 215 moves clockwise to the left out of the path of rotation of end 217a on one leg 217b of a two-legged sensing arm 217, rotatably mounted on shaft 94. Normally, sensing arm 217 is held in the retracted position shown in FIG. 18, by contact of its end 217a with the end of clapper 215. The other leg 217c of sensing arm 217 carries a cam follower roller 219 which during most of the cycle is held out of the path of movement of cam 220, but with the energization of solenoid 214 and the pulling in of its associated clapper 215, arm 217 is urged by spring 221 to rotate in a clockwise direction as cam follower 219 rests upon the periphery of cam 220. Upon initiation of the cycle immediately following round-off sensing arm 217 rotates in a clockwise direction moving its end 217a past clapper 215, to the position seen in FIGURE 20. It then stops rotating and remains in this position until the end of the cycle, the solenoid in the meantime being deenergized with its clapper now resting against the end of sensing arm leg 217b.

In moving to the condition shown in FIGURE 20, it will be noted that a projection 217d on arm 217 moves against an abutment 223 on a latch element 224 pivotally mounted on shaft 225 thus to rotate the latter in a counter-clockwise direction against the tension of spring 226. As seen in FIGURE 18, latch arm 224 normally engages a depending finger 227 of a T-shaped arm 228 to hold the latter in a retracted position. An arm 229 is provided with a stud 230 engaging a slot 231 in a leftward extension 228a of arm 228 and when latch 224 releases finger 227 a spring 233 rotates arm 229 in a counter-clockwise direction and thus, through the stud and slot connection, rotates arm 228 in a clockwise direction about shaft 213. Clockwise rotation of arm 228 moves its stud 228b, carried by a leftward extension 228c thereof, upwardly against an abutment 235 of an arm 236 pinned to shaft 213, thus to rotate the latter in a clockwise direction. Total-bail support 212, also pinned to shaft 213, thus is rotated to its extended position shown in FIGURE 19. This rotation is limited by contact of the upper end of arm 236 with an adjustable stud 237 fixed to the end plate of the accumulator (FIG. 20).

Simultaneously with this movement, a cam 240 (FIG. 21) mounted on cam shaft 92, permits a total-bail latch 241 to be rotated in a clockwise direction by a spring 242 to move its end 243 into the path of a depending leg portion 212a of total-bail arm 212, thus to latch the total-bail in its extended position for a clearing operation. During the last one tenth rotation of the cycle, cam lobe 240a rotates the total-bail latch 241 in a counter-clockwise direction, releasing the total-bail arm 212 for resetting to its retracted position by the linkage just described when the high point or lobe 220 of cam 220 (FIGS. 18 and 20) moves sensing arm 217 in a counter-clockwise direction, rotating its end 217a from the path of movement of clapper 15, permitting spring 215a to return the clapper to its extended position, as shown in FIG. 18, thus resetting the mechanism. While only one of these cam controlled latches may be sufficient, it is contemplated that one will be provided at each end of the accumulator. Two others, not cam controlled, and as identified by the numeral 241a in FIG. 22, are positioned on shaft 225 between those described above and are used for latching the total-bail during "transfer," as described hereinafter. We have now arrived at the point in the problem (FIG. 3) identified to the right of the next to last row of small squares as "Total in Multiplier Accumulator." The next step under normal cycling is to "transfer" the total or answer to the printing mechanism of the associated accounting machine.

4–20 Column Clear

While the next step in the normal operation of the accumulator is "Transfer," the problem of "20 Column Clear" can be most conveniently discussed at this point. Sometimes during the operation of the basic machine errors are made, for example, as a result of a power failure during addition, necessitating starting the problem over, in which case the accumulator should be cleared of the information already therein. This operation requires that all 20 clusters be cleared by moving all of the digit clusters to the zero position. An important difference in this operation over that described above in connection with "Clear After Round-Off" is that none of the solenoids 85 is energized and all of the clusters must be cleared.

During this "20 Column Clear" operation, the total bail is rocked and latched into position in the manner already described above and the clappers 86 are reset against the cores 84 of the solenoids 85 in the manner described above in connection with FIG. 13. It will be remembered that resetting of the clappers is controlled by cam 91 which causes shaft 94 to rotate clockwise. Rotation of the shaft 94, as seen in FIG. 12, moves arm 250 pinned thereto in a clockwise direction, and by reason of its pin and slot connection 251 causes arm 252 to rotate in a counter-clockwise direction about shaft 225. The solenoid 253 is then energized, drawing its clapper 254 upwardly behind the end 252a of arm 252, thus latching arm 252 against return movement in a clockwise direction. As a result, clappers 86 remain seated against armatures 84, leaving the clusters free to rotate until all arms 76 have moved into contact with the total-bail 210. During this operation the cam follower 95 (FIG. 13) loses contact with cam 91, but during the latter portion of the cycle the cam picks up the follower and again causes arm 252 to rotate counter-clockwise freeing clapper 254 which is moved out of the path of movement of the arm by spring 255, solenoid 253 having been deenergized. Movement of clapper 254 to its starting position permitting clappers 86 to drop back against their associated digit wheels, thus to prevent rotation of the clusters during the remaining 1/10 revolution.

Transfer

In this operation the digits in the first twelve columns on the left (see FIG. 3) are transferred into the accounting machine and the columns automatically cleared. The transfer is accomplished by raising shaft 57 (FIG. 34) until gear 74 of each of the twelve clusters meshes with the extension 259 of the accounting machine add racks 511, see FIGS. 11, 18, 34, 36 and 37, then moving the add racks to the left causing the clusters to rotate counter-clockwise until clearing arm 76 is stopped by total-bail 210, after which the shaft is lowered to its original position. Each extension 259 is secured to its associated add rack 511 by screws 259a.

Because cam shaft 29 does not rotate during transfer, the above-mentioned pair of latches 241a (FIG. 22) are mounted on shaft 225 between latches 241 to latch the total-bail during this operation. When shaft 225 is rotated in a clockwise direction, spring 242a urges the latch in the same direction to move end 243a behind depending arm 212b, thus to latch the total-bail in its advanced position. A pen 255a is provided in shaft 225 for returning the latch to its retracted position and holding it there until shaft 225 is again rotated for a transfer operation, thus releasing the total-bail to return to its retracted position.

Referring now to FIGS. 34 and 35, it will be seen that an arm 260 and a pair of cam sectors 261, one cam sector at each end of the machine, and each having a rising cam slot 261a are pinned to shaft 225, and that a link 262 extending into the accumulator from the accounting machine is pivotally connected to the end of arm 260, as indicated at 263. Movement of link 262 to the left, as explained hereinafter, moves arm 260 in a clockwise direction, causing shaft 225, and therefore cam sectors 261, to rotate in the same direction. As a result, shaft 57, which rides in cam slots 261a leaves its connection with the driving pinion 262 (FIG. 34) and is raised to mesh gear 74 with the teeth 259b on the lower edge of the add rack extension 259 (FIG. 11) positioned above the gear. As mentioned before, only twelve add racks are associated with the presently illustrated and described embodiment of the invention therefor, as shown in FIG. 35, the remaining eight clusters are associated with fixed dummy racks 264 whereby during transfer the latter clusters are retained in a static or stationary condition while shaft 57 rotates. During the clockwise movement of each cam sector 261 a stud 265 carried by a leftward extension 261b of the cam sector picks up a finger 267a of a two-legged U-shaped member 267 journalled on shaft 213, causing arm 267 to rotate in a clockwise direction also. The other finger 267b of arm 267 is connected by a coil spring 268 to an arm 269 fixed to shaft 213, and unless otherwise inhibited, rotation of U-shaped member 267 will produce similar rotation of arm 269 and consequently of shaft 213. This movement of shaft 213 will rotate total-bail 210, also pinned thereto, to its extended position, but now beneath total-arm 76—which was raised with the cluster—whereby counter-clockwise rotation of the arm by rack extensions 259 (FIG. 34), will return them to their "0" condition while the digits are being transferred to the accounting machine. Movement of the total-bail to its advanced position is halted by contact of depending arms 269a of arm 269 with a stud 270 fixed to one of the plates 138, see FIG. 35.

The actual transfer is accomplished by apparatus forming a part of the basic machine, portions of which are illustrated in FIG. 37 of the present application. For a more detailed description of this mechanism, reference may be had to FIGS. 51 and 52 of the aforesaid Butler patent, and the description thereof beginning at line 26 in column 50 of the specification. The following description of FIG. 37 is taken in part from that portion of the Butler patent and, for the most part, using the same reference characters.

Each actuator rack carries studs 522 on which is slidingly mounted a plate 523 formed with slots receiving the studs 522 and permitting limited forward and rearward movement of the slide plate 523 relative to the rack. Each slide plate 523 carries a stud 524 on which is pivotally mounted a coupling pawl 525 formed in its right end portion with a cam slot 526 which engages a stud 527 fixed on rack 511. Forwardly of cam slot 526 the coupling pawl 525 has a slot 528 having a forwardly opened horizontal portion connecting rearwardly with the vertical portion behind the shoulder 529 on pawl 525. A tension spring 530 is so connected between each actuator and its respective slide 523 as normally to hold the slide at the rearward limit of its movement on the rack in which position the parts stud 527 on the rack is in the upper forward portion of cam slot 526 in pawl 525 so that the end of said pawl occupies its lowest position as illustrated.

While the parts are in normal position with the machine at rest, a bail rod 531 extending transversely above all the actuator racks is engaged in the vertical portion of slot 528 in each of the connecting pawls 525 and between the rearwardly facing shoulder 529 of pawl 525 and a small concavity in the forward face of a shoulder 532 on the upper side of the actuator rack. Each rack is urged forward by a tension spring 533 which is connected at its rearward end to a stud on the rack and at its forward end to a fixed portion of the machine, not shown. Spring 533 also tends to hold the shoulder 532 on the rack in engagement with the rear of the bail rod 531.

The ends of bail rod 531 are secured to links 540, only one of which is shown, the forward ends of each being pivotally connected to the end 541a of lever 541 pivotally mounted on a stud 542. Each lever 541 also carries rollers 543 and 544 which cooperate respectively with cam plates 545 and 546 secured to a single hub pinned to the main drive shaft 271 of the machine. The formation and arrangement of cam plates 545 and 546, the rollers 543 and 544, and lever 541 are such that from about the 90° point to about the 165° point in each rotation of the main drive shaft, bail rod 531 is drawn forwardly. Each spring 533 maintains shoulder 532 of the associated rack 511 against bail rod 531 in the forward movement of the latter until the rack is arrested—in this case by contact of total-arm 76 with total-bail 210—whereupon bail rod 531 acts against shoulder 529 of the associated pawl 525 and moves the pawl and thus also slide 523 further forwardly relative to the arrested rack, the spring 530 yielding.

During the forward movement of slide 523 relative to the arrested rack, stud 527 on the actuator rack shifts into the rearward lower portion of cam slot 526 in pawl 525, thus raising the rearward end of the pawl and moving shoulder 529 substantially above the center of bail rod 531. By this raising of the rearward end of pawl 525, a stud 547 on the rearward end thereof is elevated into one of a series of notches 548 in a locking plate 549, there being one such notched plate 549 for each actuator rack 511. Plates 549 are supported at their forward and rearward ends on rods 536 and 538. The particular one of the notches 548 into which the stud 547 is lifted is determined by the position in which the actuator rack is arrested as described above. Stud 531 continues to move until all racks have been moved into engagement with locking plate 549.

The printing types 561 are carried on a series of vertically movable type bars 562, one being provided for each actuator rack 511. It will be seen that the lower edges of slides 523 carried by racks 511, and the lower portion of the front edge of each type bar 562 are formed with rack teeth and each rack slide 523 is geared to a respective one of the type bars 562 through an individual gear train. Each gear train includes a gear 566 in mesh with the rack teeth on a respective one of the slides 523, and a gear 568 in mesh with the rack teeth on a respective one of the type bars 562.

In each machine operation in which any of the actuator racks 511 are moved forwardly, that is, to the left as shown in FIG. 37, to the different digit indicating positions, the type bars 562 for the corresponding denominational orders are raised to position the appropriate type thereon at the printing line in front of the platen 272. With the selected type element 561 in position relative to the platen, printing hammers 605 are actuated to stroke the selected type and thus print the characters upon paper positioned over the platen. Operation of the print hammer 605 is in accordance with the description in the Butler patent.

As a load relief in the movement of racks 511 to their digit indicating positions, as described above, a power rack 511a has been added to the basic machine. As illustrated in FIG. 36, the end portion of this rack is positioned above a transfer gear 275 fixed to the end of shaft 57 and which at the initiation of a transfer cycle moves into mesh with teeth 511b along the lower edge of the rear portion of the rack. The rack is guided for reciprocatory movements on studs 276 engaged in slots 277, and is secured to and driven by bail 531 when the latter is moved by lever 541, and cams 545 and 546 through rollers 543 and 544, as described above.

It will be understood, of course, that rotation of shaft 57 by power rack 511a removes the strain which would occur if all of the pinion wheels 74 moved by racks 511 had to rotate on a stationary shaft 57. Rotation of the shaft relative to those pinions held by dummy racks 264 during the readout, will be in a direction relative to the clutch mechanism shown in FIG. 23 wherein the least friction is encountered, in accordance with the Hanstein application identified above, and because of the asymmetrical construction of the clutch element 66 (FIG. 23).

Figure 33:
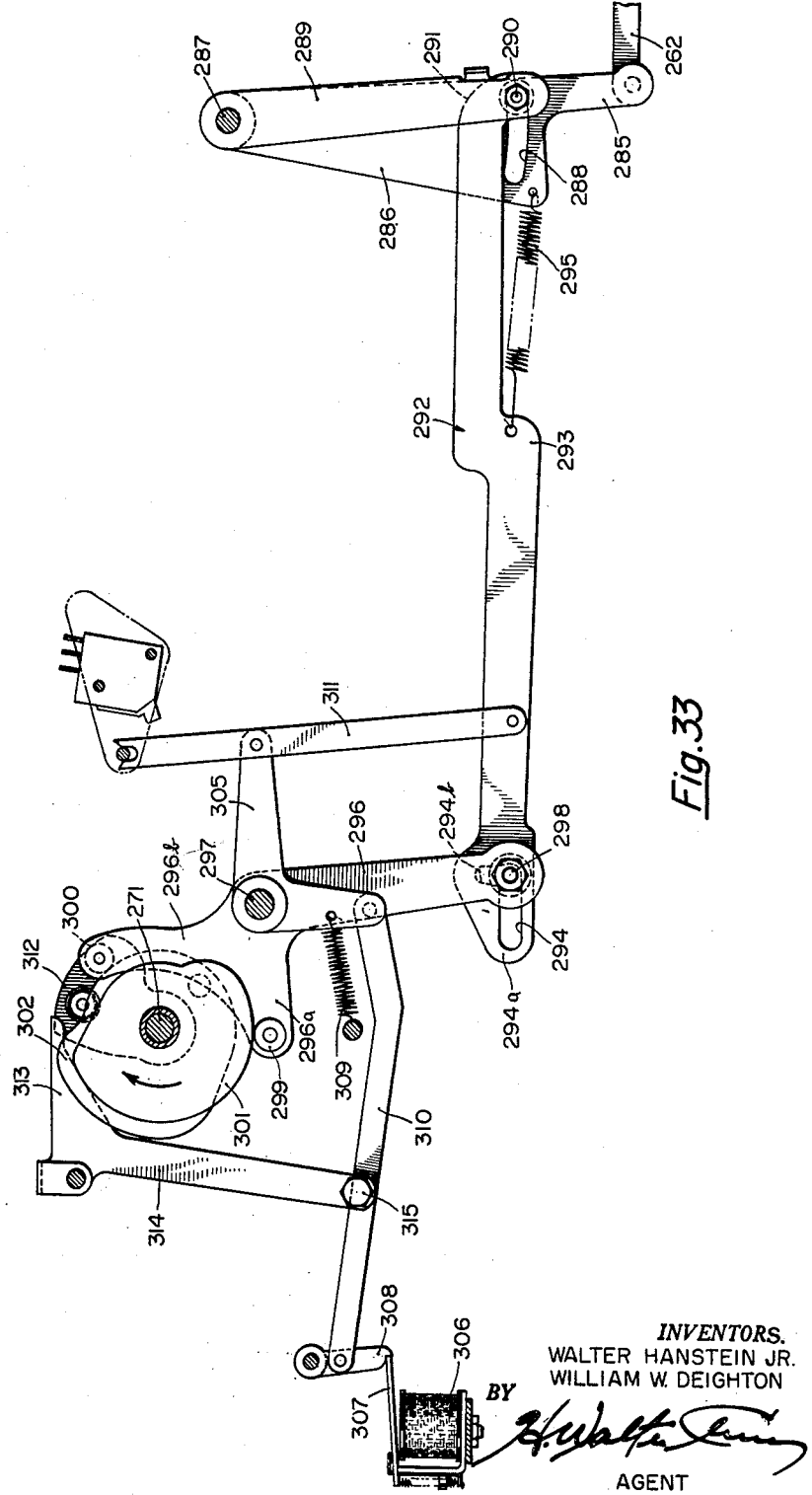
FIG. 33 is a fragmentary sectional view illustrating linkage used during a transfer operation.

With reference now to FIG. 33, it will be seen that arm 262 for rotating cam segment 261 to initiate the transfer operation, is drawn forward, or to the left, as illustrated, by means of linkage driven by cams positioned on the main drive shaft 271 of the accounting machine. More particularly, as seen in this figure, the left end of link 262 is pivotally connected to the lower end 285 of an arm 286 pivotally mounted at 287 and having an arcuate slot 288. Also pivotally mounted at 287 is an arm 289 having a stud 290 fixed to its lower end and extending through slot 288. Pivotally mounted on the lower end of arm 289 is one end 291 of a link 292 having an offset portion 293, and an inverted L-shaped slot 294 at its opposite or left end portion. A spring 295 secured between arm 286 and offset 293 of link 292, urges stud 290 to the right hand end of slot 288 under normal operating conditions, the stud and slot connection being provided only for overtravel of link 292 relative to arm 286 in the event of a mechanical jam up.

An arm 296 pivotally mounted to the basic machine at 297 is provided at its lower end with a stud 298 engaged in slot 294 in link 292. The upper end of arm 296 is bifurcated to form two arms 296a and 296b provided with cam roller 299 and 300, engaging cams 301 and 302, respectively, for oscillating arm 296 during rotation of the main shaft 271 of the basic machine. While stud 298 on the lower end of arm 296 is in registry with the lower portion 294a of cam slot 294, oscillation thereof has no effect on link 292, and therefore there is no movement of link 262 to initiate a transfer cycle.

To effect a transfer operation by the mechanism just described, link 292 must be dropped to place stud 298 in the vertical leg 294b of slot 294, whereby oscillation of arm 296 will drive link 292 first to the left to effect the transfer operation, and then to the right to reset the associated mechanism. Dropping of link 292 is effected by clockwise rotation of a bell crank 305 also pivotally mounted on shaft 297, and the movement of which is controlled by energization of a solenoid 306, whose clapper 307, when the solenoid is de-energized, holds a pivotally mounted arm 308 in a latched condition. Energization of the solenoid draws its clapper 307 downwardly out of the path of movement of link 308, permitting the latter to rotate in a clockwise direction, as urged by spring 309 through link 310, thus to rotate bell crank 305 in a clockwise direction, which moves a link 311 and consequently arm 292 downwardly to engage stud 298 in slot portion 294b. At the completion of the transfer cycle, a cam member 312 on shaft 271 moves against finger 313 of a pivotally mounted arm 314, the lower end of which is pivotally attached to link 310, as indicated at 315, thus to move link 310 to the right whereby clapper 307 may again engage arm 308 thus to reset the mechanism to the condition illustrated.

In accordance with the above description of a preferred embodiment of the present invention, it will now be understood that the invention provides novel apparatus enabling the addition of digits independently or during the operation of an accounting machine. With still more particularity it may be seen that it provides a new apparatus for the progressive accumulation of the right and left hand components of partial products during the operation of a multiplying accounting machine, while including unique carry, round-off, and clear mechanisms. Still further the apparatus is characterized by its improved means for transfer of the product to the printing apparatus of the machine.

What is claimed is:

1. In an accumulator, the combination of: a rotatable drive shaft; a plurality of digit clusters mounted for rotation on said shaft, each cluster including a digit indicating wheel, a clutch serving to couple said cluster to said shaft for rotation together, and a carry cam; control means individual to each cluster and cooperable with said wheel for enabling and disabling said clutch; means for conditioning said control means to enable said clutches; means individual to each cluster for selectively maintaining its control means in its clutch enabling condition while the cluster is rotated by said shaft to a position indicative of a selected digit; means for moving each of said control means to stop rotation of its associated cluster at said position; and means operable by said carry cams to effect carry from one wheel to another when the digit in said one wheel exceeds the units denomination, said last means comprising a plurality of serially connectable three-position single pole switches, and a three-condition linkage mechanism operable by said carry cam to its various conditions to move said poles to condition said switches to effect a carry from one wheel to the next where the digit in said one wheel is greater than the units denomination.

2. In an accumulator, the combination of: a drive shaft, means for rotating said shaft; a plurality of digit clusters mounted for rotation on said shaft; each cluster including a digit indicating wheel, a clutch serving to couple said cluster to said shaft for rotation together, a carry cam, and a total arm; control means individual to each cluster and cooperable with said wheel for enabling and disabling said clutch; means for conditioning said control means to enable said clutches; means individual to each cluster for selectively maintaining its control means in its clutch enabling condition while the cluster is rotated by said shaft to a position indicative of a selected digit; means for moving each of said control means to stop rotation of its associated cluster at said position; means operable by said carry cams to effect carry from one wheel to another when the digit in said one wheel exceeds the units denomination, said means comprising a plurality of serially connectable three-position single pole switches, and a plurality of multi-position mechanisms each operable by a carry cam to its various conditions to move one of said poles, thereby collectively to condition said switches to effect a carry from one wheel to the next where the digit in said one wheel is greater than the unit denomination; and means cooperable with said total-arms to stop all wheels in their zero indicating position.

3. An accumulator for accounting machines, comprising: a drive shaft; means for rotating said shaft; a plurality of unitary digit clusters mounted for rotation on said shaft, each cluster including a digit indicating ratchet wheel, a clutch serving to couple said cluster to said shaft for rotation together, a pinion gear, a carry cam, and a total-arm; pivotally mounted control means individual to each cluster and movable between extended and retracted positions; means biasing said control means into extended position contacting a ratchet tooth of said wheel to prevent rotation thereof thus disabling said clutch; cam operated means for moving said control means to its retracted position away from said wheel, thus to enable said clutch and permit rotation of said clusters by said shaft; electromagnetic means individual to each cluster for selectively holding said control means in retracted position whereby said clusters may be rotated by said shaft to positions indicative of selected digits; means to disable said electromagnetic means to permit said biasing means to move said control means into contact with said wheel to hold the latter at its digit indicating position; means operable by said carry cams to effect carry from one wheel to another when the digit in said one wheel exceeds the units denomination, said means comprising a plurality of serially connectable three-position single pole switches, and a plurality of three-positionable mechanisms operable by said carry cams during rotation of said clusters to move said switches into conditions to maintain certain of said electromagnets energized to effect carry from one cluster to another where the digit value in said one cluster is greater than the units denomination; means operable with said pinions to transfer the digit values of said clusters to associated apparatus in the accounting machine, said means comprising means for bodily moving said clusters thereby to move said pinions into engagement with mechanism of an associated accounting machine whereby the digit value of said clusters may be transferred to said machine; and means operable with said total-arms to stop all wheels in their zero indicating position thus clearing the accumulator.

4. An accumulator for registering successive components of a computation comprising: a drive shaft; means for rotating said shaft; a plurality of accumulator wheels journalled on said shaft, each wheel having successive projections thereon, each successive projection being representative of a successively higher order digit; friction clutch means for coupling said wheels to said shaft for rotation together; means adjacent each wheel for enabling and disabling said clutch means, said means comprising an electro-magnet and a clapper normally biased into contact with said wheel to prevent rotation thereof; means selectively to energize said electro-magnets; means to move said clappers away from said wheels and against said electro-magnets to be held there when said electromagnets are energized, thus to permit selected wheels to be rotated by said shaft to positions indicative of selected digits wherein said energized electro-magnets are denergized to permit the associated clappers to be biased into contact with a projection on the wheels to hold the latter in said digit indicating positions; and means associated with said shaft rotating means to cause said shaft to rotate intermittently in a reverse direction to relieve said clapper of strain during its movement away from said wheel.

5. A construction in accordance with claim 4 wherein said last means comprises an intermittent motion generator between said drive shaft and said shaft rotating means.

6. An accumulator for registering successive components of a computation comprising: a drive shaft; means for rotating said shaft; a plurality of accumulator wheels journalled on said shaft, each wheel having successive projections thereon, each successive projection being representative of a successively higher order digit; clutch means for coupling said wheels to said shaft for rotation together; means adjacent each wheel for enabling and disabling said clutch means, each of said means comprising an electro-magnet and a clapper; means normally biasing said clapper into contact with its associated wheel to prevent rotation thereof by engagement of said clapper with one of said projections; means selectively to energize said electro-magnets; means to move said clappers away from said wheels and against said electro-magnets to be held thereby when energized, thus to permit selected wheels to be rotated by said shaft to positions indicative of selected digits; means for deenergizing said energized electro-magnets to permit the associated clappers to be biased into contact with a projection on the wheels thus to hold the latter in said digit indicating position; and means associated with said shaft rotating means to cause said shaft to rotate intermittently in a reverse direction to relieve said clapper of strain during its movement away from said wheel.

7. An accumulator for registering successive components of a computation comprising,
   (a) a drive shaft,
   (b) means for rotating said drive shaft,
   (c) a plurality of digit indicating accumulator wheels mounted for rotation on said shaft in successively higher denominational order,
   (d) each wheel having successive projections thereon,
   (e) each successive projection being representative of a successively higher order digit,
   (f) a carry cam rotatable with said wheels,
   (g) clutch means for selectively coupling said wheels to said shaft for rotation together,
   (h) means adjacent each wheel for enabling and disabling said clutch means,
   (i) each of said last means comprising an electro-magnet and a clapper,
   (j) means normally biasing said clapper into contact with its associated wheel to prevent rotation thereof by engagement of said clapper with one of said projections,
   (k) means selectively to energize said electromagnets,
   (l) cam means for moving said clapper to its clutch enabling position away from said wheels and against said electromagnets to be held thereby when energized thus to permit selected wheels to be rotated by said shaft to positions indicative of selected digits,
   (m) means for deenergizing said energized electro-magnets to permit the associated clappers to be biased into contact with a projection on the wheels to stop and hold the wheels in said digit indicating position,
   (n) means associated with said shaft rotating means to cause said shaft to rotate intermittently in a reverse direction to relieve said clapper of strain during its movement away from said wheels, and
   (o) means to effect a carry from one wheel to the next successive highest order wheel when the digit in said one wheel exceeds the units denomination,
   (p) said carry means comprising a plurality of serially interconnectible three-position rotary switches,
   (q) and mechanical means for individually conditioning said switches to indicate a number less than nine, and cooperable with said carry cam to move the rotors of said switches to positions on said contacts indicative of a nine, or a number greater than nine, during rotation of said carry cam through a portion of its rotation whereby an impulse through said switches is effective to energize said electrical means thus enabling said clutch means to permit additional rotation of said wheels where a carry is indicated to the next digit indicating position.

8. An accumulator for registering successive components of a computation comprising,
   (a) a drive shaft,
   (b) means for rotating said drive shaft,
   (c) a plurality of digit indicating accumulator wheels mounted for rotation on said shaft in successively higher denominational order,
   (d) each wheel having successive projections thereon,
   (e) each successive projection being representative of a successively higher order digit,
   (f) a carry cam rotatable with said wheels,
   (g) clutch means for selectively coupling said wheels to said shaft for rotation together,
   (h) means adjacent each wheel for enabling and disabling said clutch means,
   (i) each of said last means comprising an electro-magnet and a clapper,
   (j) means normally biasing said clapper into contact with its associated wheel to prevent rotation thereof by engagement of said clapper with one of said projections,
   (k) means selectively to energize said electromagnets,
   (l) cam means for moving said clapper to its clutch enabling position away from said wheels and against said electromagnets to be held thereby when energized thus to permit selected wheels to be rotated by said shaft to positions indicative of selected digits,
   (m) means for deenergizing said energized electro-magnets to permit the associated clappers to be biased into contact with a projection on the wheels to stop and hold the wheels in said digit indicating position,
   (n) means associated with said shaft rotating means to cause said shaft to rotate intermittently in a reverse direction to relieve said clapper of strain during its movement away from said wheels, and
   (o) means to effect a carry from one wheel to the next successively highest order wheel when the digit in said one wheel exceeds the units denomination,
   (p) said carry means comprising a plurality of serially interconnectible three-position rotary switches,
   (q) each of said switches comprising a plurality of electrical conductive contacts formed about a common center on a flat electrically insulating panel,
   (r) and a rotor having a conductive element bridging pairs of said contacts,
   (s) said rotor normally being positioned with its conductive bridging element in the position indicative of a number less than nine,
   (t) said panel also having formed thereon a common conductor connected to one contact of each of said switches,
   (u) and a conductor interconnecting other contacts of adjacent switches,
   (v) said interconnecting conductor being electrically connected to said electrical means,
   (w) and mechanical means for individually conditioning said switches to indicate a number less than nine,
   (x) said mechanical means comprising a pivotally mounted member arranged upon rotation thereof to rotate said rotor to its other positions indicative of a nine and a number higher than nine, (y) resilient means urging said member to so rotate, and (z) means to stop such rotation in any of said number indicating positions in accordance with rotative positions of said carry cam.

References Cited in the file of this patent

UNITED STATES PATENTS

| | | |
|---|---|---|
| 388,116 | Burroughs | Aug. 21, 1888 |
| 926,151 | Vincent | June 29, 1909 |
| 1,447,871 | Lake | Mar. 6, 1923 |
| 1,880,422 | Daly et al. | Oct. 4, 1932 |
| 2,096,429 | Johnstone | Oct. 19, 1937 |
| 2,158,872 | Johnstone et al. | May 16, 1939 |
| 2,629,549 | Butler | Feb. 24, 1953 |
| 2,796,830 | Hilton | June 25, 1957 |

FOREIGN PATENTS

| | | |
|---|---|---|
| 14,736 | France | Nov. 27, 1911 |